United States Patent
Iwasa et al.

(10) Patent No.: US 9,862,897 B2
(45) Date of Patent: Jan. 9, 2018

(54) METHOD FOR PRODUCING MONOCYCLIC AROMATIC HYDROCARBON

(71) Applicant: JX Nippon Oil & Energy Corporation, Tokyo (JP)

(72) Inventors: Yasuyuki Iwasa, Tokyo (JP); Shinichiro Yanagawa, Tokyo (JP); Masahide Kobayashi, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 14/769,491

(22) PCT Filed: Feb. 21, 2014

(86) PCT No.: PCT/JP2014/054178
§ 371 (c)(1),
(2) Date: Aug. 21, 2015

(87) PCT Pub. No.: WO2014/129585
PCT Pub. Date: Aug. 28, 2014

(65) Prior Publication Data
US 2016/0024400 A1    Jan. 28, 2016

(30) Foreign Application Priority Data

Feb. 21, 2013 (JP) ................................ 2013-032335

(51) Int. Cl.
*C10G 57/00* (2006.01)
*C10G 45/68* (2006.01)
(Continued)

(52) U.S. Cl.
CPC .............. *C10G 57/00* (2013.01); *B01J 27/19* (2013.01); *B01J 29/40* (2013.01); *B01J 29/405* (2013.01);
(Continued)

(58) Field of Classification Search
CPC ...... C10G 57/00; C10G 49/002; C10G 45/68; C10G 2400/30; B01J 29/7007;
(Continued)

(56) References Cited

U.S. PATENT DOCUMENTS 2,727,854 A    12/1955  Brown et al.
2,769,753 A    11/1956  Hutchings
(Continued)

FOREIGN PATENT DOCUMENTS

CN    86101990 A    10/1987
CN    101376823 A    3/2009
(Continued)

OTHER PUBLICATIONS

Speight, James G. "Thermal cracking of petroleum." Natural and Laboratory-Simulated Thermal Geochemical Processes. Springer Netherlands, 2003. 31-52.*
(Continued)

*Primary Examiner* — In Suk Bullock
*Assistant Examiner* — Youngsul Jeong
(74) *Attorney, Agent, or Firm* — Panitch Schwarze Belisario & Nadel LLP

(57) ABSTRACT

The method for producing a monocyclic aromatic hydrocarbon includes a cracking and reforming reaction step in which a catalyst for producing a monocyclic aromatic hydrocarbon containing crystalline aluminosilicate which has been subjected to a heat treatment in an atmosphere containing water vapor in advance is loaded into a fixed-bed reactor, and a feedstock oil having a 10 volume % distillate temperature of 140° C. or higher and a 90 volume % distillate temperature of 390° C. or lower is brought into contact with the catalyst to cause a reaction, so as to obtain a product containing a monocyclic aromatic hydrocarbon having 6 to 8 carbon atoms.

7 Claims, 2 Drawing Sheets

(51) Int. Cl.
  *B01J 29/40* (2006.01)
  *C10G 49/00* (2006.01)
  *B01J 37/28* (2006.01)
  *B01J 27/19* (2006.01)
  *B01J 29/70* (2006.01)
  *B01J 38/06* (2006.01)
  *B01J 37/00* (2006.01)
  *B01J 37/02* (2006.01)

(52) U.S. Cl.
  CPC ............ *B01J 29/7007* (2013.01); *B01J 37/28* (2013.01); *C10G 45/68* (2013.01); *C10G 49/002* (2013.01); *B01J 37/0009* (2013.01); *B01J 37/0203* (2013.01); *B01J 38/06* (2013.01); *B01J 2229/186* (2013.01); *C10G 2400/30* (2013.01)

(58) Field of Classification Search
  CPC . B01J 37/28; B01J 27/19; B01J 29/405; B01J 29/40; B01J 37/0009; B01J 38/06; B01J 37/0203; B01J 2229/186
  See application file for complete search history.

(56) References Cited

U.S. PATENT DOCUMENTS

| | | | |
|---|---|---|---|
| 3,258,503 A | 6/1966 | Drehman et al. | |
| 3,755,141 A | 8/1973 | Youngblood et al. | |
| 3,806,443 A | 4/1974 | Maziuk | |
| 3,847,793 A | 11/1974 | Schwartz et al. | |
| 3,926,778 A | 12/1975 | Owen et al. | |
| 4,053,388 A | 10/1977 | Bailey | |
| 4,309,280 A | 1/1982 | Rosinski et al. | |
| 4,585,545 A | 4/1986 | Yancey, Jr. et al. | |
| 4,762,813 A * | 8/1988 | Ward | B01J 29/06 502/64 |
| 5,002,915 A * | 3/1991 | Harandi | C10G 50/00 208/78 |
| 5,143,596 A | 9/1992 | Maxwell et al. | |
| 5,183,557 A | 2/1993 | Degnan, Jr. et al. | |
| 5,582,711 A | 12/1996 | Ellis et al. | |
| 5,905,051 A | 5/1999 | Wu et al. | |
| 5,981,418 A | 11/1999 | Drake et al. | |
| 6,124,515 A | 9/2000 | Wu | |
| 6,210,563 B1 | 4/2001 | Tsao et al. | |
| 7,553,791 B2 | 6/2009 | McMinn et al. | |
| 8,846,995 B2 | 9/2014 | Yanagawa et al. | |
| 8,912,377 B2 | 12/2014 | Kim et al. | |
| 9,200,217 B2 | 12/2015 | Sagawa et al. | |
| 9,233,892 B2 | 1/2016 | Yanagawa et al. | |
| 2003/0019792 A1 | 1/2003 | Chen et al. | |
| 2003/0171634 A1 | 9/2003 | Corma | |
| 2004/0140246 A1 | 7/2004 | Lomas | |
| 2004/0215042 A1 | 10/2004 | Bottcher et al. | |
| 2005/0234279 A1 | 10/2005 | Serra et al. | |
| 2006/0014630 A1 | 1/2006 | Matsumoto et al. | |
| 2006/0207917 A1 | 9/2006 | Domokos et al. | |
| 2007/0144942 A1 | 6/2007 | Tiitta et al. | |
| 2007/0209969 A1 | 9/2007 | Shen et al. | |
| 2007/0227946 A1 | 10/2007 | Dierickx | |
| 2008/0093263 A1 | 4/2008 | Cheng et al. | |
| 2008/0256846 A1 | 10/2008 | Yoshida et al. | |
| 2008/0293561 A1 | 11/2008 | Long et al. | |
| 2009/0112034 A1 | 4/2009 | Levin | |
| 2009/0288985 A1 | 11/2009 | Long et al. | |
| 2010/0016645 A1 | 1/2010 | Cosyns et al. | |
| 2010/0145127 A1 | 6/2010 | Xie et al. | |
| 2011/0056870 A1 | 3/2011 | Rispoli et al. | |
| 2011/0270005 A1* | 11/2011 | Yanagawa | C10G 35/095 585/430 |
| 2012/0012504 A1 | 1/2012 | Minami et al. | |
| 2013/0015102 A1 | 1/2013 | Yanagawa et al. | |

FOREIGN PATENT DOCUMENTS

| | | | |
|---|---|---|---|
| CN | 101570698 A | 11/2009 | |
| CN | 102458657 A | 5/2012 | |
| CN | 102470352 A | 5/2012 | |
| CN | 102811814 A | 12/2012 | |
| CN | 102858922 A | 1/2013 | |
| EP | 0911308 A1 | 4/1994 | |
| EP | 0600686 A1 | 6/1994 | |
| EP | 1762299 A1 | 3/2007 | |
| EP | 2072604 A1 | 6/2009 | |
| EP | 2351820 A2 | 8/2011 | |
| JP | S49-41323 A | 4/1974 | |
| JP | S53-116328 A | 10/1978 | |
| JP | 02-184517 A | 7/1990 | |
| JP | 03-002128 A | 1/1991 | |
| JP | 03-026791 A | 2/1991 | |
| JP | 03-052993 A | 3/1991 | |
| JP | H03-177496 A | 8/1991 | |
| JP | H04-504577 A | 8/1992 | |
| JP | H05-64743 A | 3/1993 | |
| JP | 06-220466 A | 8/1994 | |
| JP | H08508970 A | 9/1996 | |
| JP | H08-277396 A | 10/1996 | |
| JP | H09-263775 A | 10/1997 | |
| JP | H1036860 A | 2/1998 | |
| JP | 2001-098288 A | 4/2001 | |
| JP | 2002-146364 A | 5/2002 | |
| JP | 2002-530475 A | 9/2002 | |
| JP | 2003-502478 A | 1/2003 | |
| JP | 2003-096474 A | 4/2003 | |
| JP | 2006-028493 A | 2/2006 | |
| JP | 2006-083254 A | 3/2006 | |
| JP | 2006-137922 A | 6/2006 | |
| JP | 2007-512127 A | 5/2007 | |
| JP | 2007-154151 A | 6/2007 | |
| JP | 2008-508084 A | 3/2008 | |
| JP | 2008-138188 A | 6/2008 | |
| JP | 2008-144158 A | 6/2008 | |
| JP | 2008-518778 A | 6/2008 | |
| JP | 2008-214369 A | 9/2008 | |
| JP | 2008-239877 A | 10/2008 | |
| JP | 2008-248175 A | 10/2008 | |
| JP | 2008-297452 A | 12/2008 | |
| JP | 2008-545035 A | 12/2008 | |
| JP | 2009-073919 A | 4/2009 | |
| JP | 2009079172 A | 4/2009 | |
| JP | 2009516015 A | 4/2009 | |
| JP | 2009-167257 A | 7/2009 | |
| JP | 2009-227933 A | 10/2009 | |
| JP | 2009-235247 A | 10/2009 | |
| JP | 2009-235248 A | 10/2009 | |
| JP | 2010-001462 A | 1/2010 | |
| JP | 2010-001463 A | 1/2010 | |
| JP | 2010-070732 A | 4/2010 | |
| JP | 2011190306 A | 9/2011 | |
| JP | 2012-062255 A | 3/2012 | |
| JP | 2012062356 A | 3/2012 | |
| JP | 2012241174 A | 12/2012 | |
| JP | 2013014760 A | 1/2013 | |
| KR | 20010012397 A | 2/2001 | |
| WO | 9108998 A1 | 6/1991 | |
| WO | 9521693 A1 | 8/1995 | |
| WO | 0029517 A1 | 5/2000 | |
| WO | 2007003709 A1 | 1/2007 | |
| WO | 2007055488 A1 | 5/2007 | |
| WO | 2009041508 A1 | 4/2009 | |
| WO | 2010044562 A2 | 4/2010 | |
| WO | 2010109899 A1 | 9/2010 | |
| WO | 2011090124 A1 | 7/2011 | |
| WO | WO 2011090124 A1 * | 7/2011 | ............ B01J 29/06 |
| WO | 2011118753 A1 | 9/2011 | |
| WO | 2012091092 A1 | 7/2012 | |
| WO | 2012133138 A1 | 10/2012 | |
| WO | 2012133170 A1 | 10/2012 | |
| WO | 2012133197 A1 | 10/2012 | |

(56) References Cited

FOREIGN PATENT DOCUMENTS

| WO | 2012161281 A1 | 11/2012 |
|---|---|---|
| WO | 2012169651 A1 | 12/2012 |

OTHER PUBLICATIONS

Speight, James G., ed. Petroleum chemistry and refining. CRC Press, 1997.*
Rase, Howard F. Handbook of commercial catalysts: heterogeneous catalysts. CRC press, 2000.*
Machine translated document: WO 2011090124 A1_ENGLISH.*
Shafer et al., 2006, Chemical class composition of commercial jet fuels and other specialty kerosene fuels, 14th AIAA/AHI Space Planes and Hypersonic Systems and Technologies Conference, Canberra, Australia.*
Office Action dated Mar. 9, 2016 in CN Application No. 201480009592.1
Hao et al., "Effects of Steaming Treatment on the Structure and Reaction Stability of Catalysts for C4 Producing Aromatics," Acta Petrolei Sinica (Petroleum Processing Section), pp. 206-209 (Oct. 31, 2006).
Guiru, "Catalyst and Catalysis," Dalian University of Technology Press, p. 339 (Aug. 31, 2000).
Final Office Action dated Jul. 11, 2016 in U.S. Appl. No. 14/801,089 by Yanagawa.
Kaduk et al, "Crystal Structure of Zeolite Y as a Function of Ion Exchange," The Rigaku Journal, vol. 12, No. 2 (1995).
Advisory Action dated Oct. 4, 2016 in U.S. Appl. No. 14/117,241 by Mitsui.
Office Action dated Feb. 18, 2016 in U.S. Appl. No. 13/822,556 by Yanagawa.
Final Office Action dated Oct. 7, 2016 in U.S. Appl. No. 13/822,556 by Yanagawa.
Office Action dated Dec. 12, 2016 in EP Application No. 11734727.8.
Int'l Search Report dated Apr. 26, 2011 in Int'l Application No. PCT/JP2011/050995.
Extended European Search Report dated Feb. 4, 2014 in EP Application No. 11734727.8.
Office Action dated Apr. 2, 2015 in U.S. Appl. No. 13/522,867.
Decision of Rejection dated Nov. 4, 2015 in JP Application No. 2011505307.
Int'l Search Report dated Jun. 5, 2012 in Int'l Application No. PCT/JP2012/057537.
Extended European Search Report dated Aug. 4, 2014 in EP Application No. 12765326.9.
Office Action dated Sep. 25, 2015 in U.S. Appl. No. 14/007,193 by Yanagawa.
Int'l Search Report dated Jul. 3, 2012 in Int'l Application No. PCT/JP2012/062311.
Seiichi, "Nenryo Kogaku Gairon," Shokabo Publishing Co., pp. 136-144 (Mar. 1991).
Office Action dated Sep. 23, 2016 in U.S. Appl. No. 14/769,491 by Iwasa.
Int'l Search Report dated Jun. 26, 2012 in Int'l Application No. PCT/JP2012/062312.
Nomura, "Hakuyo nenryo no Kagaku," Hirotsugu, pp. 164-166 (1994).
Extended European Search Report dated Oct. 1, 2014 in EP Application No. 12789718.9.
Office Action dated Dec. 31, 2015 in U.S. Appl. No. 14/117,241 by Mitsui.
American Petroleum Institute Petroleum HPV Testing Group, "Robust Summary of Information on Heavy Fuel Oil category," pp. 1-7 (2003).
Final Office Action dated Jul. 27, 2016 in U.S. Appl. No. 14/117,241 by Mitsui.
Int'l Search Report dated Jun. 5, 2012 in Int'l Application No. PCT/JP2012/057487.
Extended European Search Report dated Aug. 4, 2014 in EP Application No. 12762799.0.
Office Action dated Oct. 7, 2014 in JP Application No. 2011-067692.
Int'l Search Report dated Nov. 8, 2011 in Int'l Application No. PCT/JP2011/070925.
Office Action dated Mar. 6, 2014 in CN Application No. 201180043781.7.
Extended European Search Report dated May 8, 2014 in EP Application No. 11825182.6.
Matsushita et al, "Development of BTX production technology from heavier fractions by selective hydrocracking," The Aromatics, vol. 61, pp. 221-225 (2009).
Int'l Search Report dated May 10, 2011 in Int'l Application No. PCT/JP2011/057299.
Office Action dated Dec. 30, 2013 in CN Application No. 201180016142.1.
Search Report dated Apr. 9, 2014 in EP Application No. 11759557.9.
Office Action dated Dec. 18, 2014 in U.S. Appl. No. 13/822,556 by Yanagawa.
Kaduk et al, "Crystal Structure of Zeolite Y as a Function of Ion Exchange," The Rigaku Journal, vol. 2, No. 2 (1995).
Gangwer, T., "Transfer of Hydrogen by Hydroaromatics. 1. Mechanism of Dehydrogenation/Hydrogenation in Tetralin/Iron Catalyst Systems," J. Phys. Chem., vol. 84, pp. 2436-2441 (1980).
Office Action dated Oct. 25, 2016 in JP Application No. 2016-019280.
Office Action dated Oct. 19, 2016 in CN Application No. 201480009592.1.
Office Action dated Jan. 18, 2017 in KR Application No. 10-2012-7021322.
Office Action dated Feb. 1, 2017 in U.S. Appl. No. 14/801,089, by Yanagawa.
Office Action dated Jul. 19, 2017 in U.S. Appl. No. 14/801,089, by Yanagawa.
International Search Report dated May 20, 2014 in International Application No. PCT/JP2014/054178.
"Petrochemical Process," The Japan Petroleum Institute, Kodansha Ltd., pp. 21-30 (Aug. 10, 2001).

* cited by examiner

METHOD FOR PRODUCING MONOCYCLIC AROMATIC HYDROCARBON

CROSS-REFERENCE TO RELATED APPLICATION

This application is a Section 371 of International Application No. PCT/JP2014/054178, filed Feb. 21, 2014, which was published in the Japanese language on Aug. 28, 2014, under International Publication No. WO 2014/129585 A1, and the disclosure of which is incorporated herein by reference.

TECHNICAL FIELD

The present invention relates to a method for producing a monocyclic aromatic hydrocarbon and, particularly, to a method for producing a monocyclic aromatic hydrocarbon having 6 to 8 carbon atoms.

Priority is claimed on Japanese Patent Application No. 2013-032335, filed Feb. 21, 2013, the content of which is incorporated herein by reference.

BACKGROUND ART

In recent years, a technique has been proposed that efficiently produces a monocyclic aromatic hydrocarbon having 6 to 8 carbon atoms which can be used as a high octane gasoline base material or a petrochemical feedstock and has a high added value (for example, benzene, toluene, or coarse xylene; hereinafter, these will be collectively referred to as "BTX") from a feedstock containing a polycyclic aromatic hydrocarbon such as light cycle oil (hereinafter, abbreviated as "LCO") which is a cracked light oil produced in a fluid catalytic cracking (hereinafter, abbreviated as "FCC") apparatus which has so far been used mainly as a light oil or heavy oil-oriented fuel base material.

Specifically, in such a production technique (production method), a feedstock containing polycyclic aromatic hydrocarbon is contacted with a catalyst for producing monocyclic aromatic hydrocarbon, so as to subject the feedstock to cracking and reforming, thereby efficiently producing BTX. In addition, as an application of the method for producing BTX from a feedstock containing a polycyclic aromatic hydrocarbon, another method has been proposed for producing an aromatic hydrocarbon in which BTX is produced from a thermally-cracked heavy oil obtained from an apparatus for producing ethylene (for example, refer to PTL 1).

Both in the technique that produces BTX from LCO and in the technique that produces a BTX fraction from a thermally-cracked heavy oil obtained from an apparatus for producing ethylene as well, there is a desire for decreasing the production cost of BTX. Therefore, there have been demands for reducing the construction costs and operating costs of the apparatus for practicing the above technique.

For reducing the construction costs and operating costs of the apparatus, for example, it can be considered to change the cracking and reforming reaction apparatus that cracks and reforms the feedstock using a catalyst for producing monocyclic aromatic hydrocarbon with a fixed-bed reactor that has a simple configuration.

CITATION LIST

Patent Literature

[PTL 1] Japanese Unexamined Patent Application, First Publication No. 2012-062356

Non-Patent Literature

[NPL 1] "Petrochemical Process" edited by The Japan Petroleum Institute and published by Kodansha Ltd., Aug. 10, 2001, pp. 21 to 30

SUMMARY OF INVENTION

Technical Problem

However, when the cracking and reforming reaction apparatus is constituted with a fixed-bed reactor, as the cracking and reforming reaction of the feedstock proceeds, coke is generated and adheres to the surface of the catalyst for producing monocyclic aromatic hydrocarbon, and hence, the activity of the catalyst is markedly degraded. When the activity degrades as described above, in the reaction step of the cracking and reforming reaction apparatus (cracking and reforming reaction step), the yield of the BTX fraction decreases. That is, in the cracking and reforming reaction step, although the yield of BTX fraction is high at an initial stage of the step prior to deterioration of the catalyst, at an ending stage of the step when the catalyst is deteriorated, the yield may be decreased to ½ to ¼ for example.

When the yield of the BTX fraction extremely differs between the initial stage and the ending stage of the step, since the reaction step is followed by a distillation/separation step or the like in a plant, it becomes difficult to stably operate the plant. In addition, since the yield of the BTX fraction is markedly decreased at an ending stage of the step, the average yield during the step is also decreased. Alternatively, for maintaining a desired BTX yield, it is possible to shorten the time of one step; however, it becomes necessary to frequently repeat the reaction and regeneration of catalyst, thereby deteriorating the production efficiency of BTX fraction.

The present invention has been made in consideration of the above-described circumstances and an object thereof is to provide a method of producing a monocyclic aromatic hydrocarbon capable of reducing the change in time of the yield of BTX fraction in the cracking and reforming reaction step, thereby stabilizing the operation of the plant, and improving the yield of the BTX fraction in the cracking and reforming reaction step.

Solution to Problem

A method for producing a monocyclic aromatic hydrocarbon of the present invention includes a cracking and reforming reaction step in which a catalyst for producing a monocyclic aromatic hydrocarbon containing crystalline aluminosilicate which has been subjected to a heat treatment in an atmosphere containing water vapor in advance is loaded into a fixed-bed reactor, and a feedstock oil having a 10 volume % distillate temperature of 140° C. or higher and a 90 volume % distillate temperature of 390° C. or lower is brought into contact with the catalyst to cause a reaction, so as to obtain a product containing a monocyclic aromatic hydrocarbon having 6 to 8 carbon atoms.

In the above production method, it is preferable that a heating temperature at which the catalyst for producing a monocyclic aromatic hydrocarbon is subjected to the heat treatment in the atmosphere containing water vapor is 560° C. to 850° C., and the water vapor content in the atmosphere is 10 vol % to 100 vol %.

In the above production method, the crystalline aluminosilicate contained in the catalyst for producing a monocyclic aromatic hydrocarbon preferably includes a medium-pore zeolite and/or a large-pore zeolite as a main component.

In the above production method, the catalyst for producing a monocyclic aromatic hydrocarbon preferably contains at least one member selected from the group consisting of phosphorus, an alkaline-earth metal and a rare-earth element.

In the above production method, the catalyst for producing a monocyclic aromatic hydrocarbon preferably contains at least one member selected from the group consisting of oxides containing silica, alumina, silicon or aluminum as a binder.

In the above production method, in the cracking and reforming reaction step, it is preferable that two or more fixed-bed reactors be used and a cracking and reforming reaction and regeneration of the catalyst for producing a monocyclic aromatic hydrocarbon be repeated while the reactors are periodically switched.

In the above production method, the feedstock oil is a thermally-cracked heavy oil obtained from an ethylene production apparatus and a partially-hydrogenated substance of the thermally-cracked heavy oil.

Alternatively, in the production method, the feedstock oil is a cracked light oil or a partially-hydrogenated substance of the cracked light oil.

Advantageous Effects of Invention

By the method of producing a monocyclic aromatic hydrocarbon according to the present invention, it is possible to reduce the change in time of the yield of BTX fraction in the cracking and reforming reaction step, thereby stabilizing the operation of the plant. In addition, it becomes possible to improve the yield of the BTX fraction in the cracking and reforming reaction step.

DESCRIPTION OF EMBODIMENTS

Figure 1:
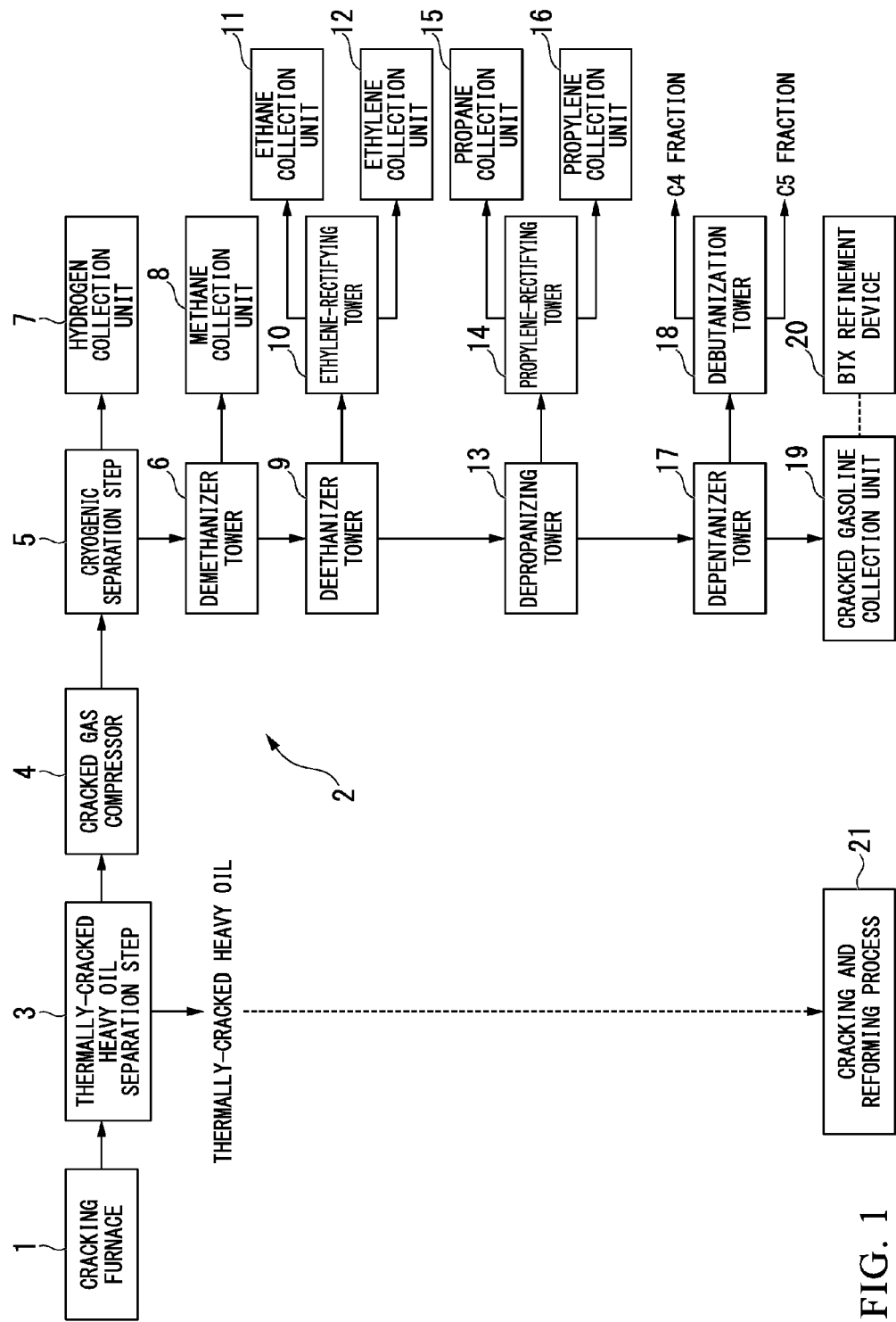
FIG. 1 is a view for illustrating an example of an apparatus for producing ethylene according to an embodiment of the present invention.

The production method of the present invention is a method of producing a monocyclic aromatic hydrocarbon having 6 to 8 carbon atoms (BTX) from a feedstock oil, and the method includes a cracking and reforming reaction step in which a catalyst for producing a monocyclic aromatic hydrocarbon containing crystalline aluminosilicate is loaded into a fixed-bed reactor, and the feedstock oil is brought into contact with the catalyst to cause a reaction, so as to obtain a product containing a monocyclic aromatic hydrocarbon having 6 to 8 carbon atoms. In the present invention, in particular, as the catalyst for producing a monocyclic aromatic hydrocarbon used in the cracking and reforming reaction step, a catalyst which has been subjected to a heat treatment in an atmosphere containing water vapor in advance is used.

(Feedstock Oil)

The feedstock oil used in the present invention is an oil having a 10 volume % distillate temperature of 140° C. or higher and a 90 volume % distillate temperature of 390° C. or lower. In an oil having a 10 volume % distillate temperature of lower than 140° C., the target monocyclic aromatic hydrocarbon (BTX) is decomposed and the productivity degrades. In addition, in a case in which an oil having a 90 volume % distillate temperature of higher than 390° C. is used, the yield of a monocyclic aromatic hydrocarbon is decreased and thus there is a tendency that the amount of coke accumulated on a catalyst for producing a monocyclic aromatic hydrocarbon increases and an abrupt degradation of the catalyst activity is caused. The 10 volume % distillate temperature of the feedstock oil is preferably 150° C. or higher and the 90 volume % distillate temperature of the feedstock is preferably 360° C. or lower. The 10 volume % distillate temperature and the 90 volume % distillate temperature refer to values measured according to JIS K 2254 "Testing Method For Distillation Of Petroleum Products".

Examples of the feedstock oil having a 10 volume % distillate temperature of 140° C. or higher and a 90 volume % distillate temperature of 390° C. or lower include a thermally-cracked heavy oil obtained from an apparatus for producing ethylene, a partially hydrogenated product of the thermally-cracked heavy oil obtained from the apparatus for producing ethylene, a cracked light oil (LCO) produced using a fluid catalytic cracking apparatus, a partially hydrogenated product (hydrorefined oil) of LCO, coal liquefaction oil, heavy oil hydrogenolysis refined oil, distilled kerosene, distilled light oil, coker kerosene, coker light oil, oil sand hydrogenolysis refined oil, and the like.

The thermally-cracked heavy oil obtained from the apparatus for producing ethylene is a fraction heavier than a BTX fraction obtained from the apparatus for producing ethylene and contains a large amount of an aromatic hydrocarbon. In addition, a cracked light oil (LCO) produced using a fluid catalytic cracking apparatus and the like also contain a large amount of an aromatic hydrocarbon. In the case where, among aromatic hydrocarbons, a fraction containing a large amount of a polycyclic aromatic is used, the fraction is likely to cause generation of coke in the cracking and reforming reaction step described later. Therefore, it is desirable to carry out a hydrogenation treatment (hydrogenation purification) prior to the cracking and reforming reaction step. Even for thermally-cracked heavy oil or LCO, when the fraction contains a large amount of monocyclic aromatic hydrocarbon, it is not always required to carry out the hydrogenation treatment. Even for other feedstock oils, the feedstock oils are selected with, basically, the same way of thinking and it is desirable to avoid feedstock oils from which coke is excessively generated in the cracking and reforming reaction.

Polycyclic aromatic hydrocarbon is a substance which has a low reactivity and is not easily converted to a monocyclic aromatic hydrocarbon in the cracking and reforming reaction of the present invention described later. However, conversely, when hydrogenated by a hydrogenation treatment (hydrogenation reaction step), the polycyclic aromatic hydrocarbon is converted to naphthenobenzene and then, when supplied to the cracking and reforming reaction step, the polycyclic aromatic hydrocarbon can be converted to a monocyclic aromatic hydrocarbon. However, among polycyclic aromatic hydrocarbons, tricyclic or higher aromatic hydrocarbons consume a large amount of hydrogen in the hydrogenation treatment (hydrogenation reaction step) and have a low reactivity in the cracking and reforming reaction step in spite of being hydrogenation reactants and thus a feedstock oil containing a large amount of tricyclic or higher aromatic hydrocarbons is not preferred. Therefore, the content of the tricyclic or higher aromatic hydrocarbon in the feedstock oil is preferably 25% by volume or less and more preferably 15% by volume or less.

The amount of the polycyclic aromatic hydrocarbon mentioned herein refers to a total value of the content of a bicyclic aromatic hydrocarbon and the content of a tricyclic or higher aromatic hydrocarbon which are measured according to JPI-5S-49 "Hydrocarbon Type Testing Method for Petroleum Products using High Performance Liquid Chromatography" or are analyzed using an FID gas chromatograph method or a two-dimensional gas chromatograph method. Hereinafter, in a case in which the content of the polycyclic aromatic hydrocarbon, the bicyclic aromatic hydrocarbon, or the tricyclic or higher aromatic hydrocarbon is expressed using % by volume, the content is a value measured according to JPI-5S-49 and, in a case in which the content is expressed using % by mass, the content is a value measured on the basis of the FID gas chromatograph method or the two-dimensional gas chromatograph method.

(Hydrogenation Treatment of Feedstock Oil)

In the case where the feedstock oil is hydrogenated by hydrogenation treatment (hydrogenation purification) in advance, i.e., in the case where a hydrogenated product of the thermally-cracked heavy oil obtained from the apparatus for producing ethylene or a hydrogenated product (hydrorefined oil) of LCO is subjected to the cracking and reforming reaction step, the hydrogenation reaction (hydrogenation treatment) is preferably conducted in the manner as described below. In the hydrogenation reaction, the hydrogenated feedstock oil is partially hydrogenated instead of being fully hydrogenated, and thus, a partially hydrogenated product of the thermally-cracked heavy oil or a partially hydrogenated product of LCO is subjected to the cracking and reforming reaction step. That is, mainly bicyclic aromatic hydrocarbon in the feedstock oil is selectively hydrogenated and is converted to a monocyclic aromatic hydrocarbon (naphthenobenzene or the like) in which only one aromatic ring is hydrogenated. Here, examples of the monocyclic aromatic hydrocarbon include indane, tetralin, alkylbenzene, and the like.

When the feedstock oil is partially hydrogenated as described above, the amount of hydrogen consumed in the hydrogenation reaction step is suppressed and, simultaneously, the amount of heat generated during the treatment can also be suppressed. For example, when naphthalene, which is a typical example of the bicyclic aromatic hydrocarbon, is hydrogenated to decalin, the amount of hydrogen consumed per mole of naphthalene reaches 5 moles; however, in a case in which naphthalene is hydrogenated to tetralin, naphthalene can be hydrogenated with an amount of hydrogen consumed of 2 moles. In addition, in the case of a fraction including an indene skeleton in the feedstock oil, the fraction needs to be hydrogenated until the indene skeleton is hydrogenated.

As the hydrogen used in the hydrogenation reaction step (hydrogenation treatment), hydrogen generated from the cracking and reforming reaction step in the present invention can be used.

The above-described hydrogenation treatment (hydrogenation reaction step) can be carried out using a well-known hydrogenation reactor. In the hydrogenation treatment, the hydrogen partial pressure at the reactor inlet is preferably in a range of 1 MPa to 9 MPa. The lower limit is more preferably 1.2 MPa or more and still more preferably 1.5 MPa or more. In addition, the upper limit is more preferably 7 MPa or less and still more preferably 5 MPa or less.

In a case in which the hydrogen partial pressure is less than 1 MPa, coke is vigorously generated on the catalyst and the catalyst life becomes short. On the other hand, in a case in which the hydrogen partial pressure exceeds 9 MPa, the amount of hydrogen consumed is significantly increased, and the construction costs of the reactor and surrounding apparatuses increase as well.

The liquid hourly space velocity (LHSV) of the hydrogenation treatment is preferably in a range of 0.05 to 10 $h^{-1}$. The lower limit is more preferably 0.1 $h^{-1}$ or more and still more preferably 0.2 $h^{-1}$ or more. In addition, the upper limit is more preferably 5 $h^{-1}$ or less and more preferably 3 $h^{-1}$ or less. In a case in which the LHSV is less than 0.05 $h^{-1}$, the construction cost of the reactor is increased. On the other hand, in a case in which the LHSV exceeds 10 $h^{-1}$, there is a possibility that the hydrogenation treatment of the feedstock oil is not satisfactorily achieved, and the reactivity is deteriorated in the later cracking and reforming reaction step.

The treatment temperature (hydrogenation reaction temperature) in the hydrogenation treatment is preferably in a range of 150° C. to 400° C. The lower limit is more preferably 170° C. or higher and still more preferably 190° C. or higher.

In addition, the upper limit is more preferably 380° C. or lower and still more preferably 370° C. or lower. In a case in which the reaction temperature is below 150° C., there is a tendency that the feedstock oil is not sufficiently hydrogenated. On the other hand, in a case in which the reaction temperature exceeds 400° C., the generation of a gas component, which is a byproduct, increases and thus the yield of a hydrogenated oil decreases, which is not desirable.

The hydrogen/oil ratio in the hydrogenation treatment is preferably in a range of 100 NL/L to 2000 NL/L.

The lower limit is more preferably 110 NL/L or more and still more preferably 120 NL/L or more. In addition, the upper limit is more preferably 1800 NL/L or less and still more preferably 1500 NL/L or less. In a case in which the hydrogen/oil ratio is less than 100 NL/L, the generation of coke on the catalyst in the reactor outlet proceeds and there is a tendency that the catalyst life becomes short. On the other hand, in a case in which the hydrogen/oil ratio exceeds 2000 NL/L, the construction costs of a recycling compressor is increased.

There is no particular limitation regarding the reaction format in the hydrogenation treatment, generally, the reaction format can be selected from a variety of processes such as a fixed bed and a movable bed and, among them, the fixed bed is preferred since the building cost or the operational costs are inexpensive. In addition, the hydrogenation reaction device preferably has a tower shape.

A catalyst for the hydrogenation treatment which is used for the hydrogenation treatment is not particularly limited as long as the catalyst is capable of selectively hydrogenating and converting bicyclic aromatic hydrocarbons in the feedstock oil to monocyclic aromatic hydrocarbons (naphthenobenzenes or the like) in which only one aromatic ring is hydrogenated, and various kinds of catalysts may be used. A preferable catalyst for the hydrogenation treatment contains at least one metal selected from Group 6 metals in the periodic table and at least one metal selected from Groups 8 to 10 metals in the periodic table. The Group 6 metal in the periodic table is preferably molybdenum, tungsten, or chromium and particularly preferably molybdenum or tungsten. The Groups 8 to 10 metal is preferably iron, cobalt, or nickel and more preferably cobalt or nickel. These metals may be singly used or a combination of two or more metals may be used. Specific examples of the combination that is preferably used include molybdenum-cobalt, molybdenum-nickel, tungsten-nickel, molybdenum-cobalt-nickel, tungsten-cobalt-nickel, and the like. The periodic table refers to the extended periodic table specified by the International Union of Pure and Applied Chemistry (IUPAC).

The catalyst for the hydrogenation treatment is preferably a catalyst obtained by supporting the above-described metals in an inorganic carrier containing aluminum oxide. Preferable examples of the inorganic carrier containing aluminum oxide include carriers obtained by adding a porous inorganic compound such as a variety of clay minerals such as alumina, alumina-silica, alumina-boria, alumina-titania, alumina-zirconia, alumina-magnesia, alumina-silica-zirconia, alumina-silica-titania, a variety of zeolites, sebiolite, and montmorillonite to alumina and, among them, alumina is particularly preferred.

The catalyst for the hydrogenation treatment is preferably a catalyst obtained by supporting at least one metal selected from Group 6 metals in the periodic table in a range of 10% by mass to 30% by mass and at least one metal selected from Groups 8 to 10 metals in the periodic table in a range of 1% by mass to 7% by mass in an inorganic carrier containing aluminum oxide in relation to the total catalyst mass which is the total mass of the inorganic carrier and the metals. In a case in which the support amount of the Group 6 metals in the periodic table and the support amount of the Groups 8 to 10 metals in the periodic table are less than the respective lower limits, there is a tendency that the catalyst does not exhibit sufficient hydrogenation treatment activity and, on the other hand, in a case in which the support amounts exceed the respective upper limits, the catalyst cost increases, the supported metals are likely to be agglomerated or the like, and there is a tendency that the catalyst does not exhibit sufficient hydrogenation treatment activity.

There is no particular limitation regarding the precursor of the metallic species used to support the metals in the inorganic carrier, the inorganic salts, organic metal compounds, or the like of the metals are used, and water-soluble inorganic salts are preferably used. In a supporting step, the metals are supported in the inorganic carrier using a solution, preferably an aqueous solution, of the metal precursor. As a supporting operation, for example, a well-known method such as an immersion method, an impregnation method, or a co-precipitation method is preferably employed.

It is preferable that the carrier in which the metal precursor is supported be sintered after being dried, preferably in the presence of oxygen, and the metallic species is, first, made to form an oxide. Furthermore, it is preferable, before the hydrogenation treatment of the feedstock oil, to form a sulfide with the metal species through a sulfurization treatment called preliminary sulfurization.

There is no particular limitation regarding the conditions of the preliminary sulfurization, but it is preferable that a sulfur compound be added to a petroleum fraction or a thermally-cracked heavy oil (hereinafter, referred to as the preliminary sulfurization feedstock oil) and the compound be continuously brought into contact with the catalyst for the hydrogenation treatment under conditions of a temperature in a range of 200° C. to 380° C., LHSV in a range of 1 to 2 $h^{-1}$, a pressure applied at the same time as the operation of the hydrogenation treatment, and a treatment time of 48 hours or longer. The sulfur compound added to the preliminary sulfurization feedstock oil is not particularly limited and is preferably dimethyl disulfide (DMDS), sulfazole, hydrogen sulfide, or the like, and approximately 1% by mass of the sulfur compound in terms of the mass of the preliminary sulfurization feedstock oil is preferably added to the preliminary sulfurization feedstock oil.

(Cracking and Reforming Reaction Step)

In the cracking and reforming reaction step which is essential in the production method of the present invention, a catalyst for producing a monocyclic aromatic hydrocarbon containing crystalline aluminosilicate which has been subjected to a heat treatment in an atmosphere containing water vapor in advance is loaded into a fixed-bed reactor, and the feedstock oil (containing hydrogenation treated oil) is brought into contact with the catalyst to cause a reaction. In this manner, a product containing a monocyclic aromatic hydrocarbon having 6 to 8 carbon atoms is obtained.

The cracking and reforming reaction step is specifically described below.

[Catalyst for Producing Monocyclic Aromatic Hydrocarbon]

The catalyst for producing monocyclic aromatic hydrocarbon. i.e., the catalyst for producing monocyclic aromatic hydrocarbon prior to heat treatment in an atmosphere containing water vapor, contains crystalline aluminosilicate. The amount of crystalline aluminosilicate is not particularly limited and is preferably 10 to 100% by mass, more preferably 20 to 95% by mass, and still more preferably 25 to 90% by mass.

[Crystalline Aluminosilicate]

As is known in the art, crystalline aluminosilicate has an acid point in Al as an active site, and the acid point contributed to the cracking and reforming reaction. The acid point of the crystalline aluminosilicate has selectivity, and particularly contributes to the reaction of cracking and reforming the feedstock oil and generating BTX fraction. However, as the reaction proceeds, coke is gradually generated and deposited, which results in the deterioration of the activity.

The crystalline aluminosilicate preferably includes a medium-pore zeolite and/or a large-pore zeolite as a main component since the yield of a monocyclic aromatic hydrocarbon can be further increased.

The medium-pore zeolite is a zeolite having a 10-membered ring skeleton structure and examples of the medium-pore zeolite include zeolites having an AEL-type, EUO-type, FER-type, HEU-type, MEL-type, MFI-type, NES-type, TON-type, or WEI-type crystal structure. Among these examples, since the yield of a monocyclic aromatic hydrocarbon can be further increased, a zeolite having the MFI-type crystal structure is preferred.

The large-pore zeolite is a zeolite having a 12-membered ring skeleton structure and examples of the large-pore zeolite include zeolites having an AFI-type, ATO-type, BEA-type, CON-type, FAU-type, GME-type, LTL-type. MOR-type, MTW-type, or OFF-type crystal structure. Among these examples, zeolites having the BEA-type, FAU-type, or MOR-type crystal structure are preferred since they can be industrially used. Further, since the yield of a monocyclic aromatic hydrocarbon can be further increased, a zeolite having the BEA-type crystal structure is preferred.

In the present invention, as the crystalline aluminosilicate constituting the catalyst for producing monocyclic aromatic hydrocarbon, it is preferable to include both a medium-pore zeolite and a large-pore zeolite since the yield of monocyclic aromatic hydrocarbon can be improved. The mixing ratio (blend ratio) of the medium-pore zeolite to the large-pore zeolite is not particularly limited, and is preferably about 6:4 to 9.5:0.5, i.e., increase the amount of the medium-pore zeolite.

In addition to the medium-pore zeolite and/or the large-pore zeolite, the crystalline aluminosilicate may contain a small-pore zeolite having less than 10-membered ring skeleton structure and an ultralarge-pore zeolite having a 14 or more-membered skeleton structure.

Here, examples of the small-pore zeolite include zeolites having an ANA-type, CHA-type, ERI-type, GIS-type, KFI-type, LTA-type, NAT-type, PAU-type, and YUG-type crystal structure.

Examples of the ultralarge-pore zeolite include zeolites having a CLO-type or VPI-type crystal structure.

In addition, in the crystalline aluminosilicate, the molar ratio (Si/Al ratio) of silicon to aluminum is 100 or less and preferably 50 or less. When the Si/Al ratio of the crystalline aluminosilicate exceeds 100, the yield of a monocyclic aromatic hydrocarbon becomes low.

That is, the higher the Si/Al ratio, the better the selectivity of the aromatic hydrocarbon; however, the reactivity is deteriorated. On the other hand, the lower the Si/Al ratio, the reactivity is improved; however, the selectivity of aromatic hydrocarbon is deteriorated. Further, for obtaining a satisfactory yield of aromatic hydrocarbons, the Si/Al ratio of the crystalline aluminosilicate is preferably 10 or more.

In the present invention, the catalyst for producing a monocyclic aromatic hydrocarbon preferably contains at least one member selected from the group consisting of phosphorus, an alkaline-earth metal and a rare-earth element.

[Phosphorus]

In the case where only phosphorus is added, the content of phosphorous in the catalyst is preferably in a range of 0.1% by mass to 10.0% by mass in a case in which the total amount of the catalyst is considered as 100% by mass. The lower limit of the content of phosphorous is preferably 0.1% by mass or more and more preferably 0.2% by mass or more in terms of suppressing deterioration in the yield of monocyclic aromatic hydrocarbons due to decrease in the activity site by hydrothermal degradation of the catalyst. On the other hand, the upper limit of the content of phosphorous is preferably 10.0% by mass or less, more preferably 7.0% by mass or less, and still more preferably 5.0% by mass or less in terms of avoiding the catalyst activity site being covered by excess phosphorus and improving the yield of monocyclic aromatic hydrocarbons.

There is no particular limitation regarding the method for adding phosphorous to the catalyst for producing a monocyclic aromatic hydrocarbon and examples thereof include a method in which phosphorous is supported on crystalline aluminosilicate, crystalline aluminogallosilicate or crystalline aluminozincosilicate using an ion exchange method, an impregnation method, or the like, a method in which a phosphorous compound is added during the synthesis of a zeolite so as to substitute a part of the inside of the skeleton of the crystalline aluminosilicate with phosphorous, a method in which a phosphorous-containing crystal accelerator is used during the synthesis of a zeolite, and the like. An aqueous solution containing phosphoric acid ions which is used during the addition of phosphorous is not particularly limited and an aqueous solution prepared by dissolving phosphoric acid, diammonium hydrogen phosphate, ammonium dihydrogen phosphate, and other water-soluble phosphate, or the like in water at an arbitrary concentration can be preferably used.

[Alkaline-Earth Metal]

As the alkaline-earth metal, at least one member selected from magnesium (Mg), calcium (Ca), strontium (Sr) and barium (Ba) is used. Among these alkaline-earth metals, it is more preferable to use calcium or strontium. In the case where only an alkaline-earth metal is added, the content of alkaline-earth metal in the catalyst depends on the kind of alkaline-earth metal used, but is preferably in a range of 0.1% by mass to 30% by mass in a case in which the total amount of the catalyst is considered as 100% by mass. The lower limit of the content of alkaline-earth metal is preferably 0.2% by mass or more and more preferably 0.5% by mass or more since a decrease in the yield of a monocyclic aromatic hydrocarbon over time due to generation and adhesion of coke can be prevented. On the other hand, the upper limit of the content of alkaline-earth metal is preferably 25% by mass or less, and more preferably 20% by mass or less in terms of avoiding the catalyst activity site being covered by excess alkaline-earth metal and improving the yield of monocyclic aromatic hydrocarbons. Even when a plurality of kinds of alkaline-earth metals are included, the total content of alkaline-earth metals is preferably in the above-mentioned range.

As a method for adding alkaline-earth metal to the catalyst for producing monocyclic aromatic hydrocarbon, the same method as described above for adding phosphorus may be adopted. Specific examples thereof include a method in which an alkaline-earth metal is supported on crystalline aluminosilicate, crystalline aluminogallosilicate or crystalline aluminozincosilicate using an ion exchange method, an impregnation method, or the like; a method in which an alkaline-earth metal compound is added during the synthesis of a zeolite so as to substitute a part of the inside of the skeleton of the crystalline aluminosilicate with an alkaline-earth metal a method in which an alkaline-earth metal-containing crystal accelerator is used during the synthesis of a zeolite, and the like. As the aqueous solution containing alkaline-earth metal, there is no particular limitation, but a nitric solution containing alkaline-earth metal may be preferably used.

[Rare-Earth Element]

As the rare-earth element, at least one member selected from lanthanum (La), cerium (Ce), praseodymium (Pr), neodymium (Nd), samarium (Sm), gadolinium (Gd) and dysprosium (Dy) is used. Among these rare-earth elements, it is more preferable to use cerium (Ce) or lanthanum (La).

In the case where only a rare-earth element is added, the content of rare-earth element in the catalyst depends on the kind of rare-earth element used, but is preferably in a range of 0.1% by mass to 30% by mass in a case in which the total amount of the catalyst is considered as 100% by mass.

The lower limit of the content of rare-earth element is preferably 0.1% by mass or more in terms of suppressing deterioration in the yield of monocyclic aromatic hydrocarbons due to hydrothermal degradation of the catalyst. On the other hand, the upper limit of the content of rare-earth element is preferably 30% by mass or less, more preferably 25% by mass or less, and still more preferably 20% by mass or less in terms of avoiding the catalyst activity site being covered by excess rare-earth element and improving the yield of monocyclic aromatic hydrocarbons. Even when a plurality of kinds of rare-earth elements are included, the total content of alkaline-earth metals is preferably in the above-mentioned range.

As a method for adding rare-earth element to the catalyst for producing monocyclic aromatic hydrocarbon, the same method as described above for adding phosphorus may be adopted. Specific examples thereof include a method in which a rare-earth element is supported on crystalline aluminosilicate, crystalline aluminogallosilicate or crystalline aluminozincosilicate using an ion exchange method, an impregnation method, or the like; a method in which a rare-earth element compound is added during the synthesis of a zeolite so as to substitute a part of the inside of the skeleton of the crystalline aluminosilicate with a rare-earth element a method in which a rare-earth element-containing crystal accelerator is used during the synthesis of a zeolite and the like. As the aqueous solution containing rare-earth element, there is no particular limitation, but a nitric solution containing rare-earth element may be preferably used.

When the catalyst for producing monocyclic aromatic hydrocarbon contains a plurality of kinds of the at least one member selected from phosphorus, alkaline-earth metal and rare-earth element, it is preferable that the total content of the at least one member is preferably about the same as the content of phosphorus in the case where only phosphorus is included.

The catalyst for producing a monocyclic aromatic hydrocarbon may further contain gallium and/or zinc. When the catalyst contains potassium and/or zinc, a more efficient BTX production can be expected.

Examples of the crystalline aluminosilicate containing potassium and/or zinc include crystalline aluminosilicate having gallium incorporated into the lattice skeleton (crystalline aluminogallosilicate), crystalline aluminosilicate having zinc incorporated into the lattice skeleton (crystalline aluminozincosilicate), crystalline aluminosilicate having gallium supported therein (Ga-supported crystalline aluminosilicate), crystalline aluminosilicate having zinc supported therein (Zn-supported crystalline aluminosilicate), and crystalline aluminosilicate containing at least one thereof.

The Ga-supported crystalline aluminosilicate and/or the Zn-supported crystalline aluminosilicate are crystalline aluminosilicates in which gallium and/or zinc are supported using a well-known method such as an ion exchange method or an impregnation method. There is no particular limitation regarding a gallium source and a zinc source used at this time and examples thereof include gallium salts such as gallium nitrate and gallium chloride, zinc salts such as gallium oxide, zinc nitrate, and zinc chloride, zinc oxide, and the like.

The lower limit of the content of gallium and/or zinc is preferably 0.01% by mass or more and more preferably 0.1% by mass or more in a case in which the total amount of the catalyst is considered as 100% by mass. When the content of gallium and/or zinc is less than 0.01% by mass, the effect of improving the yield of a monocyclic aromatic hydrocarbon cannot be achieved, which is not preferable. On the other hand, the upper limit of the content of gallium and/or zinc in the catalyst is preferably 5% by mass or less, more preferably 3% by mass or less, still more preferably 2% by mass or less, and still more preferably 1% by mass or less in a case in which the total amount of the catalyst is considered as 100% by mass. When the content of gallium and/or zinc exceeds 5% by mass, generation of coke and adhesion of coke to the catalyst becomes significant, and the yield of a monocyclic aromatic hydrocarbon becomes low, which are not preferable.

The crystalline aluminogallosilicate and/or the crystalline aluminozincosilicate are crystalline aluminosilicates having a structure in which the $SiO_4$, $AlO_4$ and $GaO_4/ZnO_4$ structure is tetrahedrally coordinated in the skeleton and can be obtained using gel crystallization through hydrothermal synthesis, a method in which gallium and/or zinc are inserted into the lattice skeleton of the crystalline aluminosilicate, or a method in which aluminum is inserted into the lattice skeleton of the crystalline gallosilicate and/or the crystalline zincosilicate.

The catalyst for producing a monocyclic aromatic hydrocarbon can be formed by firing crystalline aluminogallosilicate/crystalline aluminozincosilicate supporting at least one member selected from phosphorus, alkaline-earth metal and rare-earth metal, and gallium/zinc-supported crystalline aluminosilicate (at a firing temperature in a range of 300° C. to 900° C.) as described above.

In addition, the catalyst for producing a monocyclic aromatic hydrocarbon is formed in a powder form, a granular form, a pellet form, or the like depending on the reaction format in the cracking and reforming reaction device. In the present invention, a fixed-bed reactor is used as a cracking and reforming reaction apparatus, and the catalyst having a granular form or a pellet form is used.

In the case of obtaining a catalyst having a granular form or a pellet form, if desired, a binder may be blended with the catalyst. Specifically, after blending a binder with the catalyst, by molding using one of the various available molding machines, a catalyst having a granular form or a pellet form can be obtained.

Examples of the binder include inactive oxides, such as silica, alumina, and an inorganic substance such as an oxide containing silicon and aluminum. Examples of the oxide containing silicon and aluminum include clay mineral such as kaolin ($Al_2Si_2O_5(OH)_4$).

In the case where the catalyst for producing a monocyclic aromatic hydrocarbon contains a binder, a substance containing phosphorous, alkaline-earth metal and/or rare-earth element may be used as the binder as long as the content of phosphorous, alkaline-earth metal and/or rare-earth element is in the above-described preferable range.

In addition, in a case in which the catalyst for producing a monocyclic aromatic hydrocarbon contains a binder, it is also possible to mix the binder and the gallium and/or zinc-supported crystalline aluminosilicate or mix the binder and the crystalline aluminogallosilicate and/or crystalline aluminozincosilicate and then add phosphorous, alkaline-earth metal and/or rare-earth element, thereby producing a catalyst.

[Heat Treatment with Water Vapor]

Prior to loading into a cracking and reforming reaction apparatus to be used in the cracking and reforming reaction of the feedstock oil, the catalyst for producing a monocyclic aromatic hydrocarbon is subjected to a heat treatment with water vapor in advance, i.e., heat treatment in an atmosphere containing water vapor. By conducting such heat treatment with water vapor, as is known in the art, Al having acid points with high activity can be reduced within the catalyst (partially dissipated). That is, acid points which contribute to the reaction particularly in the initial stage of the step (initial stage of the reaction) but are significantly degraded by generation and adhesion (deposition) of coke can be decreased.

Therefore, by using a catalyst which has been subjected to such treatment, although the efficiency of the cracking and reforming reaction, i.e., the yield of BTX fraction is slightly deteriorated at an initial stage of the step, deterioration of the catalyst which occurs as the reaction proceeds can be suppressed. As a result, the feedstock oil can be more homogeneously subjected to cracking and reforming reaction (minimizing the decrease in the yield of BTX fraction) in one step. Further, since decrease in the yield due to degradation of the catalyst can be suppressed, even though Al having acid points with high activity is reduced within the catalyst, the yield of BTX fraction in the overall cracking and reforming reaction step can be improved.

As a specific condition for such heat treatment with water vapor, the heating temperature is preferably 560° C. to 850° C., and more preferably 700° C. to 800° C.

When the heating temperature is lower than 560° C., Al having acid points with high activity within the catalyst cannot be reduced. On the other hand, when the heating temperature exceeds 850° C., the cost required for the treatment becomes undesirably large.

The water vapor content in the treatment atmosphere during the heating is preferably 10 vol % to 100 vol %, and more preferably 20 vol % or more. In the case where the water vapor content is less than 100%, as the gas to be copresent, air or nitrogen is used.

The heating temperature and water vapor content are appropriately selected depending on the treatment time. Specifically, in the case where the heating temperature and the water vapor content are high, the treatment time can be relatively shortened. On the other hand, in the case where the heating temperature and the water vapor content are low, it becomes necessary to prolong the treatment time. The treatment time is preferably 10 minutes or more and less than 24 hours. When the treatment time is less than 10 minutes, it becomes difficult to homogenize the hydrothermal treatment conditions. On the other hand, when a treatment time of 24 hours or more is spent, the treatment becomes inefficient because the apparatus is occupied over a long period.

Specifically, in the case where the heating temperature is 700° C. to 800° C. and the water vapor content is 20 vol % or more, the treatment time may be 15 minutes or more and 5 hours or less.

In addition, when such heat treatment with water vapor is conducted, it is preferable to conduct a heat drying treatment of the catalyst as a pretreatment. By conducing such pretreatment (heat drying treatment) and then conducting the main treatment (heat treatment with water vapor), the time for the main treatment can be shortened, and the cost required for the heat treatment with water vapor can be suppressed.

As an apparatus for conducting such heat treatment with water vapor, for example, a multi-stage kiln may be used. In such a case, by conducting the heat drying treatment at an earlier stage, and conducting the heat treatment with water vapor at a later stage, the catalyst can be continuously treated. It is possible to conduct the heat treatment with water vapor after loading the catalyst into the reaction apparatus. It is also possible to use a batchwise hydrothermal treatment heating apparatus.

By conducting such heat treatment with water vapor, as described above, in particular, Al having acid points with high activity can be reduced within the catalyst (partially dissipated). In addition, in the case where the catalyst contains a binder, i.e., silica, alumina and/or an oxide containing silicon and aluminum, the acid points of the binder may be reduced (partially dissipated).

As a result, generation of coke by the acid points of the binder can be suppressed, and hence, deterioration of the catalyst in the cracking and reforming reaction step can be suppressed.

[Reaction Format]

As a reaction format of the cracking and reforming reaction, in the present invention, a fixed bed can be used as described above.

The fixed-bed reactor has an apparatus cost that is extremely inexpensive compared with a fluidized-bed reactor or a movable-bed reactor. That is, the fixed bed has a building cost or operational costs that are inexpensive compared with the fluidized bed or the movable bed. As the fixed-bed reactor, a single reactor may be used to repeat the cracking and reforming reaction and the catalyst regeneration; however, for continuously conducting cracking and reforming reaction, it is preferable to use 2 or more reactors, so as to repeat the cracking and reforming reaction and the catalyst generation while switching the reactors.

That is, in the fixed-bed reactor as the cracking and reforming reaction apparatus, by continuing the cracking and reforming reaction, coke is adhered to the surface of the catalyst, the activity of the catalyst degrades. When the activity degrades as described above, in the cracking and reforming reaction step, the yield of monocyclic aromatic hydrocarbons of 6 to 8 carbon atoms (BTX fraction) decreases. Therefore, the regeneration treatment of the catalyst becomes necessary.

[Reaction Temperature]

The reaction temperature when the feedstock oil is brought into contact with and is reacted with the catalyst is not particularly limited, but is preferably in a range of 350° C. to 700° C. and more preferably in a range of 400° C. to 650° C. When the reaction temperature is lower than 350° C., the reaction activity is not sufficient. When the reaction temperature exceeds 700° C., the reaction becomes disadvantageous in terms of energy and the amount of coke generated is significantly increased and thus the yield of the BTX fraction is decreased.

[Reaction Pressure]

The reaction pressure when the feedstock oil is brought into contact with and is reacted with the catalyst is in a range of 0.1 MPaG to 2.0 MPaG. That is, the feedstock oil is brought into contact with the catalyst for producing a monocyclic aromatic hydrocarbon at a pressure in a range of 0.1 MPaG to 2.0 MPaG.

In the present invention, since the reaction concept is completely different from that of a method of the related art in which hydrogenolysis is used, a condition of high pressure, which is preferred in hydrogenolysis, is not required. Conversely, a pressure higher than necessary accelerates cracking and produces unintended light gas as a byproduct, which is not preferable. In addition, the non-necessity of the high-pressure condition is also preferred in terms of the design of the reaction apparatus. That is, when the reaction pressure is in a range of 0.1 MPaG to 2.0 MPaG, it is possible to efficiently cause a cracking and reforming reaction.

[Contact Time]

The contact time between the feedstock oil and the catalyst is not particularly limited as long as a desired reaction substantially proceeds and, for example, the gas passing time over the catalyst is preferably in a range of 2 seconds to 150 seconds, more preferably in a range of 3 seconds to 100 seconds, and still more preferably in a range of 5 seconds to 80 seconds. When the contact time is shorter than 2 seconds, a substantial reaction is difficult. When the contact time exceeds 150 seconds, the amount of deposition of coke on the catalyst becomes large, and the scale of the apparatus becomes enormous, which are not preferable.

[Regeneration Treatment]

By using 2 or more fixed-bed reactors, it becomes possible to continuously conduct cracking and reforming reaction by conducting cracking and reforming reaction in a predetermined fixed-bed reactor for a predetermined time, and then switching to another fixed-bed reactor to conduct the following cracking and reforming reaction. With respect to the fixed-bed reactor which has stopped the operation of cracking and reforming reaction treatment, the regeneration of the catalyst for producing a monocyclic aromatic hydrocarbon having the degraded activity can be carried out. Alternatively, only 1 fixed-bed reactor may be used to continuously conduct the reaction and the regeneration.

Since the catalyst degradation of the catalyst is mainly caused by the attachment of coke to the catalyst surface, as the regeneration treatment, a treatment to remove coke from the catalyst surface is carried out. Specifically, air is circulated in the fixed-bed reactor (cracking and reforming reaction device) and coke adhered to the catalyst surface is combusted. Since the fixed-bed reactor is maintained at a sufficiently high temperature, the coke attached to the catalyst surface is easily combusted simply by circulating air. However, when ordinary air is supplied and circulated in the fixed-bed reactor, there is a concern of abrupt combustion. Therefore, it is preferable to supply and circulate air having an oxygen concentration decreased by interfusing nitrogen in advance to the fixed-bed reactor. That is, as the air used in the regeneration treatment, for example, air having an oxygen concentration decreased in a range of approximately several % to 10% is preferably used. In addition, it is not necessary to equal the reaction temperature and the regeneration temperature and preferred temperatures can be appropriately set.

Hereinafter, an embodiment of a case where a thermally-cracked heavy oil from an ethylene production apparatus is used as the feedstock oil will be described in detail as an example of the method of the present invention with reference to the accompanying drawings. FIG. 1 is a view for illustrating an example of the apparatus for producing ethylene used to carry out the method for producing a monocyclic aromatic hydrocarbon having 6 to 8 carbon atoms of the present invention and FIG. 2 is a view for illustrating the cracking and reforming process of the apparatus for producing ethylene illustrated in FIG. 1.

First, a schematic configuration of an example of the ethylene production apparatus used in one embodiment according to the method of the present invention will be described with reference to FIG. 1.

Figure 2:
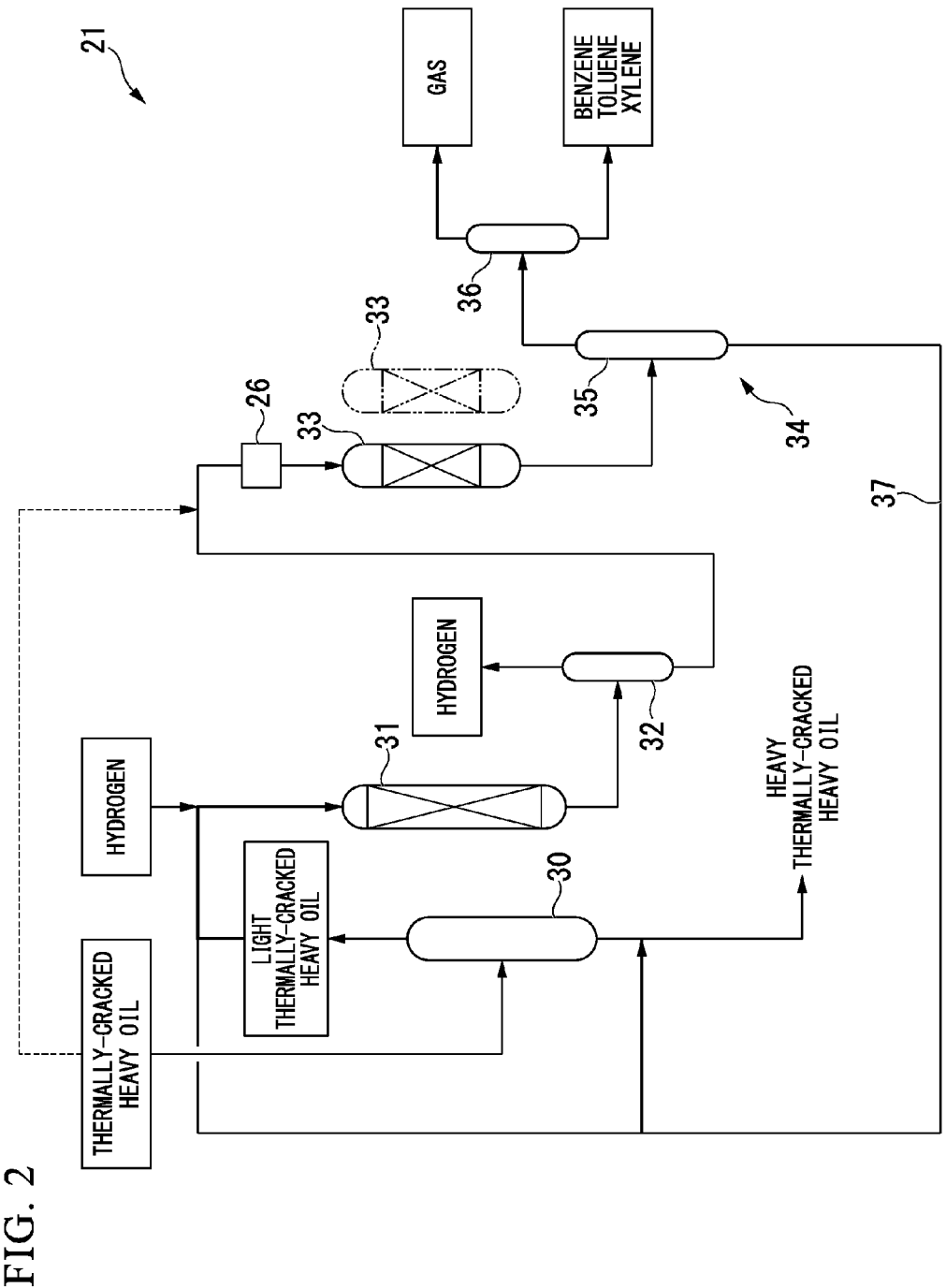
FIG. 2 is a view for illustrating a cracking and reforming process according to the present invention in a case in which the apparatus for producing ethylene illustrated in FIG. 1 is used.

The ethylene production apparatus is not limited to the configuration shown in FIG. 1, and parts other than the cracking and reforming process illustrated in FIG. 2 may be a conventional ethylene production apparatus including a cracking step and a separation and refinement step. Therefore, an apparatus produced in which the cracking and reforming process of the present invention is added to an existing ethylene production apparatus for producing ethylene is also included in the scope of the embodiment of the apparatus for producing ethylene according to the present invention. Examples of the conventional ethylene production apparatus include the apparatus described in NPL 1.

The ethylene production apparatus used in the present embodiment is also called a steam cracker, a steam cracking device, or the like and, as illustrated in FIG. 1, includes a cracking furnace 1 and a product collection device 2 that separates and collects hydrogen, ethylene, propylene, a C4 fraction, and a fraction containing a monocyclic aromatic hydrocarbon having 6 to 8 carbon atoms (BTX fraction: cracked gasoline) respectively from a cracked product produced in the cracking furnace 1.

The cracking furnace 1 thermally cracks feedstocks such as a naphtha fraction, a kerosene fraction, and a light fraction, produces hydrogen, ethylene, propylene, a C4 fraction, and the BTX fraction, and produces a thermally-cracked heavy oil as a residual oil (bottom oil) heavier than the BTX fraction. The thermally-cracked heavy oil is also called a heavy aromatic residue oil (HAR oil) in some cases. The operation conditions of the cracking furnace 1 are not particularly limited and the cracking furnace can be operated under ordinary conditions. For example, diluted water vapor is used as a feedstock and the cracking furnace is operated at a thermal cracking reaction temperature in a range of 770° C. to 850° C. and a retention time (reaction time) in a range of 0.1 seconds to 0.5 seconds. When the thermal cracking temperature is lower than 770° C., cracking does not proceed and a target product cannot be obtained and thus the lower limit of the thermal cracking reaction temperature is more preferably 775° C. or higher and still more preferably 780° C. or higher. On the other hand, when the thermal cracking temperature exceeds 850° C., the amount of gas generated abruptly increases, thus, hindrance is caused in the operation of the cracking furnace 1, and thus the upper limit of the thermal cracking reaction temperature is more preferably 845° C. or lower and still more preferably 840° C. or lower. The steam/feedstock (mass ratio) is desirably in a range of 0.2 to 0.9, more desirably in a range of 0.25 to 0.8, and still more desirably in a range of 0.3 to 0.7. The retention time (reaction time) of the feedstock is more desirably in a range of 0.15 seconds to 0.45 seconds and still more desirably in a range of 0.2 seconds to 0.4 seconds.

The product collection device 2 includes a thermally-cracked heavy oil separation step 3 and further includes individual collection units that separate and collect hydrogen, ethylene, propylene, a C4 fraction, and a fraction containing a monocyclic aromatic hydrocarbon having 6 to 8 carbon atoms (BTX fraction: cracked gasoline) respectively.

The thermally-cracked heavy oil separation step 3 is a distillation tower that separates a cracked product obtained in the cracking furnace 1 into a component having a higher boiling point and a component having a lower boiling point on the basis of a specific boiling point before the beginning of main distillation. The lower boiling point component separated in the thermally-cracked heavy oil separation step 3 is extracted in a gas form and is pressurized using a cracked gas compressor 4. The specific boiling point is set so that the target products of the apparatus for producing ethylene, that is, hydrogen, ethylene, propylene, furthermore, a C4 fraction, and cracked gasoline (BTX fraction), are mainly included in the lower boiling point component.

In addition, the higher boiling point component (bottom fraction) separated in the thermally-cracked heavy oil separation step 3 becomes the thermally-cracked heavy oil and may be further separated as necessary. For example, a gasoline fraction, a light thermally-cracked heavy oil, a heavy thermally-cracked heavy oil, and the like can be separated and collected using the distillation tower or the like.

Gas (cracked gas) that has been separated in the thermally-cracked heavy oil separation step 3 and has been pressurized using the cracked gas compressor 4 is separated into hydrogen and a component having a higher boiling point than hydrogen in a cryogenic separation step 5 after washing or the like. Next, the component heavier than hydrogen is supplied to a demethanizer tower 6 and methane is separated and collected. In addition to the above-described configuration, a hydrogen collection unit 7 and a methane collection unit 8 are formed on the downstream side of the cryogenic separation step 5. The collected hydrogen and methane are both used in a new process described below.

The higher boiling point component separated in the demethanizer tower 6 is supplied to a deethanizer tower 9.

Ethylene, ethane, and a component having a higher boiling point than ethylene and ethane are separated in the deethanizer tower 9. The ethylene and ethane separated in the deethanizer tower 9 are separated into ethylene and ethane using an ethylene-rectifying tower 10 and the ethylene and ethane are collected respectively. In addition to the above-described configuration, an ethane collection unit 11 and an ethylene collection unit 12 are formed on the downstream side of the ethylene-rectifying tower 10.

The collected ethylene becomes a main product that is produced using the apparatus for producing ethylene. In addition, the collected ethane can also be supplied to the cracking furnace 1 together with the feedstocks such as a naphtha fraction, a kerosene fraction, and a light fraction and be recycled.

The higher boiling point component separated in the deethanizer tower 9 is supplied to a depropanizing tower 13. In addition, propylene, propane, and a component having a higher boiling point that propylene and propane are separated in the depropanizing tower 13. From the propylene and propane separated in the depropanizing tower 13, the propylene is rectified and separated using a propylene-rectifying tower 14 and is collected. In addition to the above-described configuration, a propane collection unit 15 and a propylene collection unit 16 are formed on the downstream side of the propylene-rectifying tower 14. The collected propylene also becomes a main product that is produced using the apparatus for producing ethylene together with ethylene.

The higher boiling point component separated in the depropanizing tower 13 is supplied to a depentanizer tower 17. In addition, a component having 5 or less carbon atoms and a component having a higher boiling point than the above-described component, that is, a component having 6 or more carbon atoms, are separated in the depentanizer tower 17. The component having 5 or less carbon atoms separated in the depentanizer tower 17 is separated into a C4 fraction mainly made of a component having 4 carbon atoms and a C5 fraction mainly made of a component having 5 carbon atoms in a debutanization tower 18 and the fractions are collected respectively. The component having 4 carbon atoms separated in the debutanization tower 18 can also be additionally supplied to an extraction and distillation device or the like, be separated into butadiene, butane, isobutane, and butylene, and these substances can be collected respectively. In addition to the above-described configuration, a butylene collection unit (not illustrated) is formed on the downstream side of the debutanization tower 18.

The higher boiling point component separated in the depentanizer tower 17, that is, the component having 6 or more carbon atoms, mainly contains a monocyclic aromatic hydrocarbon having 6 to 8 carbon atoms and is thus collected as cracked gasoline. In addition to the above-described configuration, a cracked gasoline collection unit 19 is formed on the downstream side of the depentanizer tower 17.

The cracked gasoline (BTX fraction) collected in the cracked gasoline collection unit 19 is supplied to a BTX refinement device 20 that separates the cracked gasoline into benzene, toluene, and xylene and then collects them respectively. Here, benzene, toluene, and xylene can also be respectively separated and collected and the BTX refinement device is desirably installed from the viewpoint of the production of chemical goods.

At this time, a component (C9+) having 9 or more carbon atoms contained in the cracked gasoline is separated from the BTX fraction and is collected in the BTX refinement device 20. It is also possible to install a device for separation in the BTX refinement device 20. The component having 9 or more carbon atoms can be used as a feedstock oil for producing BTX described below similar to the thermally-cracked heavy oil separated in the thermally-cracked heavy oil separation step 3.

Next, a method for producing a hydrocarbon using the apparatus for producing ethylene, that is, a method for producing a monocyclic aromatic hydrocarbon having 6 to 8 carbon atoms according to one embodiment of the present invention, will be described with reference to FIGS. 1 and 2.

The apparatus for producing ethylene according to the present embodiment is an apparatus that, as illustrated in FIG. 1, produces an olefin and a BTX fraction in the cracking and reforming process 21 using the thermally-cracked heavy oil (HAR oil) separated and collected in the thermally-cracked heavy oil separation step 3, that is, mainly a hydrocarbon (aromatic hydrocarbon) having 9 or more carbon atoms heavier than the BTX fraction as a feedstock oil. In addition, it is also possible to use a heavy oil remaining after the collection of the BTX fraction from the cracked gasoline collection unit 19 as a feedstock.

In the latter part of the thermally-cracked heavy oil separation step 3, a part of fractions generated after the separation of the thermally-cracked heavy oil into a plurality of fractions or an oil remaining after other chemical goods or fuels are produced from the separated fractions is also a part of a residual oil (bottom oil) obtained from the cracking furnace 1 and is thus contained in the thermally-cracked heavy oil of the present invention, that is, a thermally-cracked heavy oil obtained from the apparatus for producing ethylene. Examples of the production of chemical goods or fuels from the separated fractions include the production of a petroleum resin from a light thermally-cracked heavy oil having approximately 9 or 10 carbon atoms. In addition, a part of fractions generated during the separation of a heavy oil fraction obtained by collecting the BTX fraction from the cracked gasoline collection unit 19 into a plurality of fractions or an oil remaining after other chemical goods or fuels are produced from the separated fractions is also, similarly, contained in the thermally-cracked heavy oil.

In the present embodiment, the apparatus has a configuration illustrated in FIG. 2 in order to carry out the cracking and reforming process 21. The configuration of the apparatus illustrated in FIG. 2 is intended to produce a monocyclic aromatic hydrocarbon having 6 to 8 carbon atoms (BTX fraction) in which a thermally-cracked heavy oil obtained from the apparatus for producing ethylene is used as a feedstock oil and BTX fraction is produced.

(Characteristics of Thermally-Cracked Heavy Oil)

While there is no particular specification, the thermally-cracked heavy oil in the present invention preferably has the following characteristics.

Characteristics obtained from a distillation test significantly vary depending on the cracking temperature or the cracking feedstock, but the 10 volume % distillate temperature (T10) is preferably in a range of 145° C. to 230° C. The 90 volume % distillate temperature (T90) and the end point vary more significantly depending on fractions being used and thus there is no limitation. However, when a fraction directly obtained from the thermally-cracked heavy oil separation step 3 is used, for example, the 90 volume % distillate temperature (T90) is preferably in a range of 400° C. to 600° C. and the end point (EP) is preferably in a range of 450° C. to 800° C.

It is preferable that the density at 15° C. be in a range of 1.03 g/cm$^3$ to 1.08 g/cm$^3$, the kinematic viscosity at 50° C.

be in a range of 20 mm²/s to 45 mm²/s, the content of sulfur (sulfur component) be in a range of 200 ppm by mass to 700 ppm by mass, the content of nitrogen (nitrogen component) be 20 ppm by mass or less, and the aromatic hydrocarbon be 80% by volume or more.

Here, the distillation test refers to a test in which characteristics are measured according to "Testing Method For Distillation Of Petroleum Products" described in JIS K 2254, the density at 15° C. refers to the density measured according to "Vibrating Density Testing Method" of "Crude Petroleum And Petroleum Products-Determination Of Density And Petroleum Measurement Tables (excerpt)" described in JIS K 2249, the kinematic viscosity at 50° C. refers to a value obtained according to JIS K 2283 "Crude Petroleum And Petroleum Products-Determination Of Kinematic Viscosity And Calculation Method For Viscosity Index Of Crude Oil And Petroleum Products", the content of sulfur refers to the content of sulfur measured according to "Energy-Dispersive X-Ray Fluorescence Method" of "Crude Petroleum And Petroleum Products-Determination Of Sulfur Content" described in JIS K 2541-1992, the content of nitrogen refers to the content of nitrogen measured according to "Crude Petroleum And Petroleum Products-Determination Of Nitrogen Content" according to JIS K 2609, and the content of aromatic hydrocarbon refers to the content of total aromatic hydrocarbons measured using Japan Petroleum Institute Standard JPI-5S-49-97 "Hydrocarbon Type Testing Method For Petroleum Products Using High Performance Liquid Chromatography", respectively.

However, in the present embodiment, the thermally-cracked heavy oil is not directly used as a feedstock oil. The thermally-cracked heavy oil is distilled and separated in advance at a predetermined cut temperature (the 90 volume % distillate temperature is 390° C.) in an early distillation tower 30 illustrated in FIG. 2 and is separated into a light fraction (light thermally-cracked heavy oil) and a heavy fraction (heavy thermally-cracked heavy oil). In addition, a light fraction is used as the feedstock oil. The thus obtained feedstock oil is an oil having a 10 volume % distillate temperature of 140° C. or higher and a 90 volume % distillate temperature of 390° C. or lower.

The feedstock oil according to the present embodiment may include other base materials as long as the feedstock oil includes the thermally-cracked heavy oil obtained from the apparatus for producing ethylene.

The heavy fraction is separately stored and is used as, for example, a fuel.

As the feedstock oil according to the present embodiment, in addition to the light thermally-cracked heavy oil obtained by the distillation treatment in the early distillation tower 30, the component (aromatic hydrocarbon) having 9 or more carbon atoms separated and collected in the cracked gasoline collection unit 19 as described above can also be used.

In addition, for the fraction having distillation characteristics of a 10 volume % distillate temperature (T10) adjusted to 140° C. or higher and a 90 volume % distillate temperature (T90) adjusted to 390° C. or lower in the previous treatment (pretreatment), it is not always necessary to carry out distillation in the early distillation tower 30. Therefore, as described below, separately from a thermally-cracked heavy oil illustrated in FIG. 2, it is also possible to directly supply the feedstock oil to a hydrogenation reaction device 31 or a cracking and reforming reaction device 33 which is a device that configures the cracking and reforming process 21 provided behind the early distillation tower 30.

Part or all of the feedstock oil obtained as described above is partially hydrogenated using the hydrogenation reaction device 31. That is, as described above in the aforementioned (Hydrogenation treatment of feedstock oil), part or all of the feedstock oil is provided to a hydrogenation reaction step, so as to subject part or all of the feedstock oil to partial hydrogenation treatment.

In the present embodiment, only the light thermally-cracked heavy oil, that is, only part of the feedstock oil, is partially hydrogenated. On a component mainly containing a hydrocarbon having 9 carbon atoms or a component having 9 or more carbon atoms separated and collected in the cracked gasoline collection unit 19 out of a part of fractions generated during the separation of the thermally-cracked heavy oil into a plurality of fractions or an oil remaining after other chemical goods or fuels are produced from the separated fractions, the hydrogenation treatment may not be carried out. However, it is needless to say that, even on the above-described components, the partial hydrogenation treatment may be carried out using the hydrogenation reaction device 31.

As shown in FIG. 2, the hydrogenated oil obtained by the hydrogenation reaction device 31 has hydrogen removed therefrom by the later-stage dehydrogenation tower 32, and then supplied to the cracking and reforming reaction device 33 to be subjected to a cracking and reforming reaction. The cracking and reforming reaction device 33 may have directly supplied thereto, together with the hydrogenated oil, a fraction containing hydrocarbons of about 9 to 10 carbon atoms which does not contain a large amount of polycyclic aromatics and requires low need of hydrogenation.

A heat furnace 26 is provided between the dehydrogenation tower 32 and the cracking and reforming reaction device 33, and the hydrogenated oil as the feedstock oil and the C9 fraction are heated to a predetermined temperature as a pretreatment. Specifically, when contacted with the catalyst in the cracking and reforming reaction device 33, the feedstock oil and the like are preferably in a gaseous phase. Therefore, by heat treating with the heat furnace 26, the feedstock oil can be rendered gaseous or in a state close to gaseous phase. The hydrogen removed at the dehydrogenation tower 32 and collected may be returned to the hydrogenation reaction device 31 and subjected to the hydrogenation treatment, and recovered in the ethylene production apparatus.

The cracking and reforming reaction device 33 has the catalyst for producing a monocyclic aromatic hydrocarbon accommodated therein, and the supplied feedstock oil (containing the hydrogenated oil) is brought into contact with the catalyst, the feedstock oil and the catalyst are reacted together, and a product containing a monocyclic aromatic hydrocarbon having 6 to 8 carbon atoms is obtained. As described above, as the catalyst for producing a monocyclic aromatic hydrocarbon loaded in the cracking and reforming reaction device 33, a catalyst which has been subjected to a heat treatment in an atmosphere containing water vapor in advance is used.

Further, the cracking and reforming reaction device 33 has a reaction format of a fixed-bed, i.e., constituted of a fixed-bed reactor. The fixed-bed reactor has an apparatus cost that is extremely inexpensive compared with a fluidized-bed reactor or a movable-bed reactor. That is, the fixed bed has a building cost or operational costs that are inexpensive compared with the fluidized bed or the movable bed. Therefore, in the present embodiment, as shown in FIG. 2, 2 fixed-bed cracking and reforming reaction devices 33 (fixed-bed reactors) are used. Although it is possible to repeat the reaction and regeneration with a single fixed-bed reactor, repeat the reaction, it is preferable to install 2 or more reactors. FIG. 2 shows 2 cracking and reforming reaction devices 33; however, the present embodiment is not limited thereto, and an arbitrary number of 2 or more devices may be installed.

In the fixed-bed cracking and reforming reaction device 33, as the cracking and reforming reaction proceeds, in particular, coke is attached to the catalyst surface and the activity of the catalyst degrades (the activity becomes low). When the activity degrades as described above, in the cracking and reforming reaction step conducted by the cracking and reforming reaction device 33, the yield of monocyclic aromatic hydrocarbons of 6 to 8 carbon atoms (BTX fraction) while only 1 cracking and reforming reaction device 33 is operated decreases.

In particular, in the conventional method in which the catalyst for producing a monocyclic aromatic hydrocarbon is directly loaded into the cracking and reforming reaction device 33 without the heat treatment in an atmosphere containing water vapor, although the yield of BTX fraction is high in an initial stage of the cracking and reforming reaction step conducted by operating just 1 cracking and reforming reaction device 33, at an ending stage of the step when the catalyst is deteriorated, the yield may be significantly decreased (for example, to ½ to ¼ of the yield at an initial stage). As a result, since the yield of BTX fraction significantly changes from the initial stage to the ending stage of the step, the operation conditions in the later stage of the cracking and reforming step significantly changes, such that the operation was extremely difficult.

In contrast, in the present embodiment, as described above, a catalyst for producing a monocyclic aromatic hydrocarbon which has been subjected to heat treatment in an atmosphere containing water vapor in advance is loaded into the cracking and reforming reaction device 33, so as to conduct the cracking and reforming reaction. Therefore, although the yield of BTX fraction becomes slightly low in an initial stage of the cracking and reforming reaction step conducted by operating just 1 cracking and reforming reaction device 33 as compared to the conventional method, since degradation of the catalyst during the step can be suppressed, the yield is not greatly decreased at an ending stage of the step. As a result, the yield of BTX fraction in the step does not greatly change from the initial stage to the ending stage, and therefore, the total yield of BTX fraction in the step becomes larger than that in the conventional method. Further, since the yield of BTX fraction in the step does not greatly change from the initial stage to the ending stage, the operation conditions at a later stage of the cracking and reforming reaction step becomes stable, and the operation becomes easier.

However, even in the present embodiment using a catalyst for producing a monocyclic aromatic hydrocarbon which has been subjected to heat treatment in an atmosphere containing water vapor in advance, decrease (degradation) in the activity due to adhesion of coke occurs. Therefore, as described above, after operating the fixed-bed cracking and reforming reaction device 33 for a predetermined time set in advance, regeneration treatment of the catalyst having the activity thereof deteriorated by adhesion of coke is conducted.

Specifically, 2 or more cracking and reforming reaction devices 33 are used, and a cracking and reforming reaction and regeneration of the catalyst for producing a monocyclic aromatic hydrocarbon are repeated while the reactors are periodically switched. The operation time for continuously operating 1 cracking and reforming reaction device 33 depends on the size and various operation conditions (reaction conditions), and is from several hours to about 10 days. By increasing the number of cracking and reforming reaction devices 33, the operation time for operating each reactor can be shortened, so that the deterioration of the activity of the catalyst can be suppressed, and the time required for regeneration can be shortened.

With respect to the reaction conditions of the cracking and reforming reaction device 33, i.e., the reaction temperature, the reaction pressure and the contact time, the reaction is conducted under the conditions as described above.

Further, the regeneration of the catalyst for producing a monocyclic aromatic hydrocarbon is also conducted as described above. That is, after conducting the cracking and reforming reaction treatment by a first cracking and reforming reaction device 33, the operation of the cracking and reforming reaction treatment is switched to a second cracking and reforming reaction device 33. With respect to the first cracking and reforming reaction device 33 which has stopped the operation of cracking and reforming reaction treatment, regeneration of the catalyst for producing a monocyclic aromatic hydrocarbon is carried out.

(Refinement and Collection of BTX Fraction)

A cracking and reforming reaction product derived from the cracking and reforming reaction device 33 contains a gas containing an olefin having 2 to 4 carbon atoms, a BTX fraction, and an aromatic hydrocarbon of C9 or more. Therefore, the cracking and reforming reaction product is separated into the respective components, refined, and collected using a refinement and collection device 34 provided behind the cracking and reforming reaction device 33.

The refinement and collection device 34 includes a BTX fraction collection tower 35 and a gas separation tower 36.

In the BTX fraction collection tower 35, the cracking and reforming reaction product is distilled and separated into a light fraction having 8 or less carbon atoms and a heavy fraction having 9 or more carbon atoms. In the gas separation tower 36, the light fraction having 8 or less carbon atoms separated in the BTX fraction collection tower 35 is distilled and separated into a BTX fraction containing benzene, toluene, and coarse xylene and a gas fraction having a boiling point lower than that of the BTX fraction. In the BTX fraction collection tower 35 and the gas separation tower 36, the fractions obtained from the respective towers are retreated and thus it is not necessary to increase the distillation accuracy and it is possible to carry out the distillation operation in a relatively brief manner.

(Product Collection Step)

As described above, in the gas separation tower 36, since the distillation operation is carried out in a relatively brief manner, the gas fraction separated in the gas separation tower 36 mainly contains hydrogen, C4 fractions such as ethylene, propylene, and butylene, and BTX. Therefore, the gas fraction, that is, a gas fraction that serves as a part of the product obtained in the cracking and reforming reaction step, is treated again in the product collection device 2 as illustrated in FIG. 1. That is, the gas fraction is provided to the thermally-cracked heavy oil separation step 3 together with the cracking product obtained in the cracking furnace 1. In addition, hydrogen or methane is separated and collected by treating the gas fraction mainly using the cracked gas compressor 4, the demethanizer tower 6, and the like and, furthermore, the gas fraction is treated using the deethanizer tower 9 and the ethylene-rectifying tower 10 so as to collect ethylene. In addition, the gas fraction is treated using the depropanizing tower 13 and the propylene-rectifying tower 14 so as to collect propylene and is treated using the depentanizer tower 17, the debutanization tower 18, and the like so as to collect a cracked gasoline (BTX fraction) such as butylene or butadiene.

Benzene, toluene, and xylene separated using the gas separation tower 36 illustrated in FIG. 2 are provided to the BTX refinement device 20 illustrated in FIG. 1, and benzene, toluene, and xylene are respectively refined and rectified so as to be separated and collected as products. In addition, in the present embodiment, BTX is collectively collected, but may be respectively and separately collected using the configuration of the apparatus and the like in the latter part. For example, xylene may be directly supplied to an apparatus for producing paraxylene or the like instead of the BTX refinement device.

(Recycling Step)

The heavy fraction (bottom fraction) having 9 or more carbon atoms separated in the BTX fraction collection tower 35 is returned to the hydrogenation reaction device 31 through a recycling path 37 (recycling step) which is recycle means and is again provided to the hydrogenation reaction step together with the light thermally-cracked heavy oil derived from the early distillation tower 30. That is, the heavy fraction (bottom fraction) is returned to the cracking and reforming reaction device 33 through the hydrogenation reaction device 31 and is provided to the cracking and reforming reaction step. In the recycling step (recycling path 37), for example, a heavy component having a 90 volume % distillate temperature (T90), as a distillation characteristic, of higher than 390° C. is preferably cut back before being provided to the hydrogenation reaction device 31 (hydrogenation reaction step) and stored with the heavy thermally-cracked heavy oil. Even in a case in which a fraction having a 90 volume % distillate temperature (T90) of higher than 390° C. is rarely contained, it is preferable to discharge a certain amount of the fraction outside the system when fractions having a low reactivity are accumulated or the like.

Thus far, the refinement, collection, and recycling to the cracking and reforming reaction step of the cracking and reforming reaction product derived from the cracking and reforming reaction device 33 have been described, but it is also possible to return all the cracking and reforming reaction product to the product collection device 2 in the apparatus for producing ethylene and collect and treat the cracking and reforming reaction product and, in this case, the installment of the refinement and collection device 34 is not required. In addition, it is also possible to recycle the heavy fraction (bottom fraction) having 9 or more carbon atoms obtained from the bottom of the BTX fraction collection tower 35 to the hydrogenation reaction device 31, return the fraction having 8 or less carbon atoms obtained from the top of the tower to the product collection device 2 in the apparatus for producing ethylene, and treat the fractions at the same time.

In the method of producing a monocyclic aromatic hydrocarbon of 6 to 8 carbon atoms according to the present embodiment, as the catalyst for producing a monocyclic aromatic hydrocarbon used in the cracking and reforming reaction step, a catalyst for producing a monocyclic aromatic hydrocarbon containing crystalline aluminosilicate which has been subjected to a heat treatment in an atmosphere containing water vapor in advance is used, and the catalyst is loaded into a fixed-bed reactor, and a feedstock oil is brought into contact with the catalyst to cause a reaction, so as to obtain a product containing a monocyclic aromatic hydrocarbon having 6 to 8 carbon atoms. As a result, in the cracking and reforming reaction step, degradation of the catalyst due to generation and adhesion of coke can be suppressed, such that decrease in the yield of BTX fraction between the initial stage and the ending stage can be suppressed.

Therefore, in the cracking and reforming reaction step, the yield can be homogenized between the initial stage and the ending stage, and the operation of the plant in the later stage can be stabilized, so as to easily operate. Further, by homogenizing the yield between the initial stage and the ending stage in the cracking and reforming reaction step, the total yield of BTX fraction in the cracking and reforming reaction step can improved as compared to the conventional method.

In addition, since the fixed-bed reactor of an apparatus cost that is extremely lower compared with that of the fluidized-bed reactor is used, it is possible to suppress the cost of the configuration of the apparatus used for the cracking and reforming process 21 at a sufficiently low level.

In addition, since two or more fixed-bed reactors are used as the cracking and reforming reaction device 33 and the cracking and reforming reaction and the regeneration of the catalyst for producing a monocyclic aromatic hydrocarbon are repeated by periodically switching the reactors, it is possible to produce the BTX fraction with high production efficiency.

Further, by virtue of subjecting a feedstock oil containing partially hydrogenated product of a thermally-cracked heavy oil obtained from an ethylene production apparatus to a cracking and reforming reaction by the cracking and reforming reaction device 33, BTX fraction can be efficiently produced.

The present invention is not limited to the embodiment and a variety of modifications are permitted within the scope of the gist of the present invention.

For example, in the present embodiment, the thermally-cracked heavy oil obtained from the apparatus for producing ethylene or the partially-hydrogenated substance of the thermally-cracked heavy oil is used as the feedstock oil; however, as the feedstock oil of the present invention, any oils other than the thermally-cracked heavy oil or the partially-hydrogenated substance of the thermally-cracked heavy oil may be used as long as the 10 volume % distillate temperature is 140° C. or higher and the 90 volume % distillate temperature is 390° C. or lower. Specifically, a cracked light oil (LCO) which satisfies the distillation characteristics and is produced in the FCC apparatus or a partially-hydrated substance of the cracked light oil may be used as the feedstock oil of the present invention.

Even in such a case, by virtue of using a catalyst for producing a monocyclic aromatic hydrocarbon containing crystalline aluminosilicate which has been subjected to a heat treatment in an atmosphere containing water vapor in advance, in the cracking and reforming reaction step, degradation of the catalyst due to generation and adhesion of coke can be suppressed, so that decrease in the yield of BTX fraction between the initial stage and the ending state can be suppressed.

In addition, even a mixture of a plurality of the feedstock oils can be used as the feedstock oil in the present application as long as the distillation characteristics of a 10 volume % distillate temperature of 140° C. or higher and a 90 volume % distillate temperature of 390° C. or lower are satisfied.

In addition, in the embodiment, the cracking and reforming reaction is caused using the cracking and reforming reaction device 33 and a part of the obtained product is collected using the product collection device 2 in the apparatus for producing ethylene, but all of the product obtained from the cracking and reforming reaction may be collected using the product collection device 2 in the apparatus for producing ethylene.

Furthermore, in the present embodiment, a part of the product obtained through the cracking and reforming reaction in the cracking and reforming reaction device 33 is collected in the product collection device 2 in the apparatus for producing ethylene, but it is also possible to carry out a collection treatment on the respective components using collection devices in other plants different from the apparatus for producing ethylene instead of carrying out a collection treatment on the product obtained through the cracking and reforming reaction using the product collection device 2 in the apparatus for producing ethylene. Examples of the other apparatuses include an FCC apparatus.

EXAMPLES

Hereinafter, the present invention will be more specifically described based on examples and comparative examples but the present invention is not limited to these examples.

[Method for Producing Hydrogenated Oil of Feedstock Oil] (Preparation of Catalyst for Hydrogenation Treatment)

Water glass No. 3 was added to 1 kg of an aqueous solution of sodium aluminate having a concentration of 5% by mass and the components were put into a container maintained at 70° C. A solution obtained by adding an aqueous solution of titanium sulfate (IV) (24% by mass in terms of the content of $TiO_2$) to 1 kg of an aqueous solution of aluminum sulfate having a concentration of 2.5% by mass was prepared in another container maintained at 70° C. and this solution was added dropwise to the aqueous solution containing the sodium aluminate for 15 minutes. The amounts of the water glass and the aqueous solution of titanium sulfate were adjusted so as to obtain predetermined contents of silica and titania.

A point in time when the pH of the mixed solution fell in a range of 6.9 to 7.5 was set as an end point, and the obtained slurry-form product was filtered through a filter, thereby obtaining a cake-form slurry. The cake-form slurry was moved to a container equipped with a reflux condenser, 300 ml of distilled water and 3 g of an aqueous solution of 27% ammonia were added, and were heated and stirred at 70° C. for 24 hours. The stirred slurry was put into a kneading apparatus, was heated at 80° C. or higher, and was kneaded while removing moisture, thereby obtaining a clay-form kneaded substance.

The obtained kneaded substance was molded into a cylinder shape having a diameter of 1.5 mm using an extruder, was dried at 110° C. for 1 hour, and then was sintered at 550° C., thereby obtaining a shaped carrier. 300 g of the obtained shaped carrier was taken and was soaked with a soaking solution, which was prepared by adding molybdenum trioxide, cobalt (II) nitrate hexahydrate, and phosphoric acid (having a concentration of 85%) to 150 ml of distilled water and adding malic acid until the components were dissolved, through spraying.

The amounts of the molybdenum trioxide, the cobalt (II) nitrate hexahydrate, and the phosphoric acid used were adjusted so as to obtain a predetermined support amount. A specimen soaked with a soaking solution was dried at 110° C. for 1 hour and then was sintered at 550° C., thereby obtaining a catalyst A. In the catalyst A, the content of $SiO_2$ was 1.9% by mass and the content of $TiO_2$ was 2.0% by mass in terms of the carrier, and the amount of $MoO_3$ supported was 22.9% by mass, the amount of CoO supported was 2.5% by mass, and the amount of $P_2O_5$ supported was 4.0% by mass in terms of the catalyst.

(Preparation of Feedstock Oil)

Only the light component was separated from a thermally-cracked heavy oil obtained from the ethylene production apparatus illustrated in FIG. 1 through a distillation operation, thereby preparing a thermally-cracked heavy oil A. Further, the thermally-cracked heavy oil and components of 9 or more carbon atoms (aromatic hydrocarbons) separated and collected at the cracked gasoline collection unit were mixed together, thereby preparing thermally-cracked heavy oil B. In addition, a cracked light oil C obtained from an FCC apparatus was prepared. The characteristics of each feedstock oil are described in Table 1.

TABLE 1

| Name | | Thermally-cracked heavy oil A | Thermally-cracked heavy oil B | Cracked light oil C |
|---|---|---|---|---|
| Density at 15° C. (g/ml) | | 0.9903 | 0.912 | 0.9328 |
| Kinetic viscosity at 30° C. ($mm^2/s$) | | — | — | 3.007 |
| Kinetic viscosity at 40° C. ($mm^2/s$) | | 1.6010 | 0.9457 | — |
| Sulfur content (mass %) | | 0.025 | 0.001 | 0.160 |
| Distillation characteristics (° C.) | IBP | 194 | 163 | 182 |
| | T10 | 211 | 171 | 213 |
| | T90 | 256 | 221 | 343 |
| | EP | 291 | 252 | 373 |
| Saturated content (mass %) | | 1 | 4 | 21 |
| Aromatic content (mass %) | | 98 | 95 | 76 |
| Aromatic content of 2 or more rings (mass %) | | 77 | 23 | 46 |

(Hydrogenation Reaction of Feedstock Oil)

The catalyst A was loaded into a fixed-bed continuous circulation-type reaction apparatus and, first, the preliminary sulfurization of the catalyst was carried out. That is, to a fraction (preliminary sulfurization feedstock oil) corresponding to a straight distillation-based light oil having a density at 15° C. of 0.8516 g/ml, an initial boiling point of 231° C. and a finishing boiling point of 376° C. in a distillation test, a content of a sulfur component of 1.18% by mass in terms of a sulfur atom on the basis of the mass of the preliminary sulfurization feedstock oil, and a hue of L1.5, 1% by mass of DMDS in terms of the mass of the fraction was added, and the mixture was continuously supplied to the catalyst A for 48 hours.

After that, each of the thermally-cracked heavy oil A, the thermally-cracked heavy oil B and the cracked light oil C described in Table 1 was used as the feedstock oils and a hydrogenation treatment was carried out at a reaction temperature of 300° C., LHSV=1.0 $h^{-1}$, a hydrogen oil ratio of 500 NL/L, and a pressure of 3 MPa. The characteristics of the obtained hydrogenated thermally-cracked heavy oil A-1, hydrogenated thermally-cracked heavy oil B-1 and hydrogenated cracked light oil C-1 are described in Table 2.

TABLE 2

| Name | | Hydrogenated thermally-cracked heavy oil A | Hydrogenated thermally-cracked heavy oil B | Hydrogenated cracked light oil C |
|---|---|---|---|---|
| Density at 15° C. (g/ml) | | 0.9498 | 0.902 | 0.9051 |
| Kinetic viscosity at 30° C. ($mm^2/s$) | | — | — | 2.938 |
| Kinetic viscosity at 40° C. ($mm^2/s$) | | 1.616 | 0.9478 | — |
| Sulfur content (mass %) | | 0.0003 | 0.0002 | 0.0003 |
| Distillation | IBP | 192 | 160 | 189 |

TABLE 2-continued

| Name | | Hydrogenated thermally-cracked heavy oil A | Hydrogenated thermally-cracked heavy oil B | Hydrogenated cracked light oil C |
|---|---|---|---|---|
| characteristics (° C.) | T10 | 201 | 169 | 212 |
|  | T90 | 252 | 219 | 330 |
|  | EP | 314 | 251 | 368 |
| Saturated content (mass %) | | 8 | 7 | 34 |
| Aromatic content (mass %) | | 92 | 93 | 66 |
| Aromatic content of 2 or more rings (mass %) | | 5 | 4 | 10 |

The distillation characteristics in Tables 1 and 2 were respectively measured according to "Testing Method For Distillation Of Petroleum Products" described in JIS K 2254. In addition, the density at 15° C. in Table 1 was measured according to "Testing Method For Distillation Of Petroleum Products" described in JIS K 2254, the kinematic viscosity at 30° C. and 40° C. was measured according to "Crude Petroleum And Petroleum Products-Determination Of Kinematic Viscosity And Calculation Method For Viscosity Index Of Crude Oil And Petroleum Products" described in JIS K 2283, and the content of sulfur was measured according to "Crude Petroleum And Petroleum Products-Determination Of Sulfur Content" described in JIS K 2541, respectively.

In addition, the respective compositions in Tables 1 and 2 were computed by carrying out a mass analysis (apparatus: manufactured by JEOL Ltd., JMS-700) through an EI ionization method on saturated hydrocarbon content and aromatic hydrocarbon content obtained through silica gel chromate fractionation and carrying out the type analysis of hydrocarbons according to ASTM D2425 "Standard Test Method for Hydrocarbon Types in Middle Distillates by Mass Spectrometry".

[Production Method of Aromatic Hydrocarbon] [Preparation Example of Catalyst for Producing Monocyclic Aromatic Hydrocarbon] "Preparation of Catalyst Including Phosphorous-Containing Proton-Type MFI Zeolite"

A solution (A) made up of 1706.1 g of sodium silicate (J silicate soda No. 3, $SiO_2$: 28% by mass to 30% by mass, Na: 9% by mass to 10% by mass, the balance of water, manufactured by Nippon Chemical Industrial Co., Ltd.) and 2227.5 g of water and a solution (B) made up of 64.2 g of $Al_2(SO_4)_3 \cdot 14$ to $18H_2O$ (special grade chemical, manufactured by Wako Pure Chemical Industries, Ltd.), 369.2 g of tetrapropylammonium bromide, 152.1 g of $H_2SO_4$ (97% by mass), 326.6 g of NaCl, and 2975.7 g of water were prepared respectively.

Next, while the solution (A) was stirred at room temperature, the solution (B) was slowly added to the solution (A). The obtained mixture was vigorously stirred for 15 minutes using a mixer, a gel was crushed and thus was put into a homogeneous fine milky state.

Next, the mixture was put into a stainless steel autoclave and a crystallization operation was carried out under the self-pressure under conditions in which the temperature was set to 165° C., the time was set to 72 hours, and the stirring rate was set to 100 rpm. After the end of the crystallization operation, the product was filtered so as to collect the solid product and washing and filtration were repeated 5 times using approximately 5 liters of deionized water. A solid substance obtained through filtration was dried at 120° C. and, furthermore, was sintered at 550° C. for 3 hours under air circulation.

As a result of an X-ray diffraction analysis (instrument name: Rigaku RINT-2500V), the obtained sintered substance was confirmed to have an MFI structure. In addition, the $SiO_2/Al_2O_3$ ratio (molar ratio) obtained through a fluorescent X-ray analysis (instrument name: Rigaku ZSX101e) was 65. In addition, the content of an aluminum element contained in the lattice skeleton computed from the result was 1.3% by mass.

Next, an aqueous solution of 30% by mass of ammonium nitrate was added at a proportion of 5 mL per gram of the obtained sintered substance, the mixture was heated and stirred at 100° C. for 2 hours, then, was filtered and washed with water. This operation was repeated 4 times and then the mixture was dried at 120° C. for 3 hours, thereby obtaining an ammonium-type MFI zeolite. After that, firing was carried out at 780° C. for 3 hours, thereby obtaining a proton-type MFI zeolite.

Next, 30 g of an aqueous solution of diammonium hydrogen phosphate was soaked into 30 g of the obtained proton-type MFI zeolite so that 2.0% by mass of phosphorous (a value when the total mass of the proton-type MFI zeolite was set to 100% by mass) was supported and was dried at 120° C. After that, the zeolite was sintered at 780° C. for 3 hours under air circulation, thereby obtaining a phosphorous-containing proton-type MFI zeolite. A pressure of 39.2 MPa (400 kgf) was applied to the zeolite so as to carry out tablet compression and the catalyst was coarsely crushed so as to have sizes in a range of 20 mesh to 28 mesh, thereby obtaining a granular body of a catalyst B.

"Preparation of Catalyst Including Calcium-Containing Proton-Type MFI Zeolite"

In the same manner as in the "phosphorus-containing proton-type", an aqueous solution of calcium nitrate was soaked into 30 g of the obtained proton-type MFI zeolite so that 2.2% by mass of calcium (a value when the total mass of the proton-type MFI zeolite was set to 100% by mass) was supported and was dried at 80° C., followed by stirring. In this manner, the calcium ion and the proton derived from aluminum were ion-exchanged. Subsequently, the resultant was dried at 120° C. After that, the zeolite was sintered at 780° C. for 3 hours under air circulation, thereby obtaining a calcium-containing proton-type MFI zeolite. A pressure of 39.2 MPa (400 kgf) was applied to the zeolite so as to carry out tablet compression and the catalyst was coarsely crushed so as to have sizes in a range of 20 mesh to 28 mesh, thereby obtaining a granular body of a catalyst C.

"Preparation of Catalyst Including Lanthanum-Containing Proton-Type MFI Zeolite"

In the same manner as in the "phosphorus-containing proton-type", an aqueous solution of lanthanum (III) nitrate was soaked into 30 g of the obtained proton-type MFI zeolite so that 5.0% by mass of lanthanum (a value when the total mass of the proton-type MFI zeolite was set to 100% by mass) was supported and was dried at 80° C., followed by stirring. In this manner, the lanthanum ion and the proton derived from aluminum were ion-exchanged. Subsequently, the resultant was dried at 120° C. After that, the zeolite was sintered at 780° C. for 3 hours under air circulation, thereby obtaining a lanthanum-containing proton-type MFI zeolite. A pressure of 39.2 MPa (400 kgf) was applied to the zeolite so as to carry out tablet compression and the catalyst was coarsely crushed so as to have sizes in a range of 20 mesh to 28 mesh, thereby obtaining a granular body of a catalyst D.

"Preparation of Phosphorous-Containing Proton-Type BEA Zeolite"

A first solution was prepared by dissolving 59.1 g of silicic acid ($SiO_2$: 89% by mass) in 202 g of an aqueous solution of tetraethylammonium hydroxide (40% by mass). The first solution was added to a second solution prepared by dissolving 0.74 g of an Al pellet and 2.69 g of sodium hydroxide in 17.7 g of water. The first solution and the second solution were mixed together as described above, thereby obtaining a reaction mixture having a composition (in terms of the molar ratio of an oxide) of $2.4Na_2O$-$20.0(TEA)_2$-$Al_2O_3$-$64.0SiO_2$-$612H_2O$.

This reaction mixture was put into a 0.3 L autoclave and was heated at 150° C. for 6 days. In addition, the obtained product was separated from the parent liquid and was washed with distilled water.

As a result of an X-ray diffraction analysis (instrument name: Rigaku RINT-2500V) of the obtained product, the product was confirmed to be a BEA-type zeolite from the XRD pattern.

After that, ions were exchanged using an aqueous solution of ammonium nitrate (30% by mass), the BEA-type zeolite was sintered at 550° C. for 3 hours, thereby obtaining a proton-type BEA zeolite.

"Preparation of Catalyst Including Phosphorous-Containing Proton-Type BEA Zeolite"

Next, 30 g of an aqueous solution of diammonium hydrogen phosphate was soaked into 30 g of the proton-type BEA zeolite so that 2.0% by mass of phosphorous (a value when the total mass of the crystalline aluminosilicate was set to 100% by mass) was supported and was dried at 120° C. After that, the zeolite was sintered at 780° C. for 3 hours under air circulation, thereby obtaining a catalyst containing the proton-type BEA zeolite and phosphorous. After that, a pressure of 39.2 MPa (400 kgf) was applied to the catalyst obtained by mixing 9 parts by weight of the phosphorous-containing proton-type MFI zeolite with 1 part by weight of the phosphorous-supported proton-type BEA zeolite so as to carry out tablet compression and the catalyst was coarsely crushed so as to have sizes in a range of 20 mesh to 28 mesh, thereby obtaining a granular body of a catalyst E.

[Heat Treatment of Catalyst for Producing Monocyclic Aromatic Hydrocarbon with Water Vapor]

Using the catalysts B to E, hydrothermally treated catalysts B-1 to B-13, C-1, D-1, E-1 and E-2 shown in Table 3 were prepared by combining predetermined water vapor content, heating temperature and treatment time.

TABLE 3

| | Name of hydrothermally treated catalyst | | | | | | | |
|---|---|---|---|---|---|---|---|---|
| | B-1 | B-2 | B-3 | B-4 | B-5 | B-6 | B-7 | B-8 |
| | | | | Catalyst | | | | |
| | B | B | B | B | B | B | B | B |
| Water vapor content (vol %) | 100 | 5 | 5 | 100 | 50 | 50 | 100 | 100 |
| Water vapor treatment temperature (° C.) | 550 | 650 | 650 | 650 | 700 | 700 | 700 | 700 |
| Water vapor treatment time (h) | 24 | 24 | 4 | 4 | 2 | 4 | 2 | 4 |

| | Name of hydrothermally treated catalyst | | | | | | | | |
|---|---|---|---|---|---|---|---|---|---|
| | B-9 | B-10 | B-11 | B-12 | B-13 | C-1 | D-1 | E-1 | E-2 |
| | | | | | Catalyst | | | | |
| | B | B | B | B | B | C | D | E | E |
| Water vapor content (vol %) | 100 | 100 | 100 | 100 | 100 | 100 | 50 | 50 | 100 |
| Water vapor treatment temperature (° C.) | 750 | 860 | 700 | 700 | 700 | 750 | 750 | 750 | 700 |
| Water vapor treatment time (h) | 4 | 4 | 0.25 | 0.5 | 1 | 4 | 4 | 4 | 0.5 |

[Production of Monocyclic Aromatic Hydrocarbon Having 6 to 8 Carbon Atoms]

Hydrogenated thermally-cracked heavy oil A-1, hydrogenated thermally-cracked heavy oil B-1 or hydrogenated cracked light oil C-1 was introduced into a reactor using a circulation-type reaction apparatus having a reactor loaded with the hydrothermally treated catalyst (10 ml) and the feedstock oil and the catalyst were brought into contact with and were reacted with each other under a condition in which the reaction temperature was set to 550° C., the reaction pressure was set to 0.1 MPaG, and the contact time between the feedstock and the catalyst was set to 25 seconds. The feedstock oils used and the hydrothermally treated catalysts were combined together so as to produce Examples 1 to 15 and Comparative Examples 1 to 8 as described in Table 4.

TABLE 4

| | Example 1 | Example 2 | Example 3 | Example 4 | Example 5 | Example 6 | Example 7 | Example 8 |
|---|---|---|---|---|---|---|---|---|
| Feedstock | Hydrogenated thermally cracked heavy oil B-1 | Hydrogenated thermally cracked heavy oil B-1 | Hydrogenated thermally cracked heavy oil B-1 | Hydrogenated thermally cracked heavy oil B-1 | Hydrogenated thermally cracked heavy oil B-1 | Hydrogenated cracked light oil C-1 | Hydrogenated thermally cracked heavy oil B-1 | Hydrogenated thermally cracked heavy oil B-1 |
| Hydrothermally treated | B-9 | B-8 | B-4 | B-6 | B-5 | B-9 | E-1 | B-7 |

TABLE 4-continued

| catalyst BTX yield (mass %) | 37 | 38 | 43 | 41 | 45 | 29 | 38 | 41 |
|---|---|---|---|---|---|---|---|---|

| | Example 9 | Example 10 | Example 11 | Example 12 | Example 13 | Example 14 | Example 15 |
|---|---|---|---|---|---|---|---|
| Feedstock | Hydrogenated thermally cracked heavy oil B-1 | Hydrogenated thermally cracked heavy oil B-1 | Hydrogenated thermally cracked heavy oil A-1 | Hydrogenated cracked light oil C-1 | Hydrogenated cracked light oil C-1 | Hydrogenated thermally cracked heavy oil B-1 | Hydrogenated thermally cracked heavy oil B-1 |
| Hydrothermally treated catalyst | C-1 | D-1 | B-6 | B-11 | B-12 | B-13 | E-2 |
| BTX yield (mass %) | 40 | 40 | 34 | 30 | 29 | 41 | 42 |

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Feedstock | Hydrogenated thermally cracked heavy oil B-1 | Hydrogenated thermally cracked heavy oil B-1 | Hydrogenated thermally cracked heavy oil B-1 | Hydrogenated thermally cracked heavy oil B-1 | Hydrogenated thermally cracked heavy oil B-1 | Hydrogenated thermally cracked heavy oil B-1 | Hydrogenated cracked light oil C-1 | Hydrogenated thermally cracked heavy oil A-1 |
| Hydrothermally treated catalyst | B (No hydrothermal treatment) | B-1 | B-2 | B-3 | B-10 | E (No hydrothermal treatment) | B (No hydrothermal treatment) | B (No hydrothermal treatment) |
| BTX yield (mass %) | 18 | 24 | 25 | 23 | 24 | 19 | 18 | 17 |

Under the conditions shown in Table 4, reaction was conducted for 24 hours to produce monocyclic aromatic hydrocarbons having 6 to 8 carbon atoms (benzene, toluene, xylene). The whole amount of the obtained products were collected, and the compositional analyses of the products were carried out through an FID gas chromatograph so as to evaluate the catalyst activities. The evaluation results of the average yield of BTX (benzene, toluene, xylene) after reacting for 24 hours are shown in Table 4.

As seen from the results shown in Table 4, in Examples 1 to 15 in which reaction was conducted with a catalyst which had been subjected to heat treatment in an atmosphere containing water vapor in advance, monocyclic aromatic hydrocarbons of 6 to 8 carbon atoms (benzene, toluene, xylene) could be produced with a favorable yield as compared to Comparative Examples 1, 6, 7 and 8 in which reaction was conducted with a catalyst which had not been subjected to hydrothermal treatment, Comparative Example 5 in which reaction was conducted with a catalyst that had been subjected to excess hydrothermal treatment, and Comparative Examples 2 to 4 in which reaction was conducted with a catalyst which had not been subjected to sufficient hydrothermal treatment. By conducting an appropriate hydrothermal treatment, in the initial stage of the step (initial stage of the reaction), significant generation of coke and degradation due to adhesion (deposition) of coke can be suppressed, and significant acid points can be reduced.

Therefore, it was confirmed that, in Examples 1 to 15 of the present invention, it was possible to efficiently produce BTX by using a catalyst which had been subjected to an appropriate hydrothermal treatment in advance.

Subsequently, reactions were caused under the above-described conditions for the times described in Table 5 so as to produce monocyclic aromatic hydrocarbons having 6 to 8 carbon atoms (benzene, toluene, and xylene) and the compositional analyses of the products were carried out through an FID gas chromatograph directly coupled to the reaction apparatus so as to evaluate the catalyst activities over time. The evaluation results are described in Table 5.

TABLE 5

| | | Example 16 Hydrogenated thermally-cracked heavy oil A-1 | | Comparative Example 9 Hydrogenated thermally-cracked heavy oil A-1 | |
|---|---|---|---|---|---|
| Feedstock | | | | | |
| Hydrothermally treated catalyst | | B-6 | | B (No hydrothermal treatment) | |
| Reaction time (h) | | 0.5 | 24 | 0.5 | 24 |
| Yield (%) | Light fraction, other gases | 12 | 11 | 11 | 6 |
| | BTX | 45 | 32 | 50 | 15 |
| | Heavy fraction | 43 | 57 | 39 | 79 |
| Average BTX yield during 24 hours reaction (%) | | 34 (same as BTX yield of Example 11) | | 17 (same as BTX yield of Comparative Example 8) | |

From the results shown in Table 5, it was confirmed that, in Example 16 in which reaction was conducted with a catalyst which had been subjected to heat treatment in an atmosphere containing water vapor in advance, the amount of decrease in the yield of BTX fraction between 30 minutes after start of the reaction (initial stage of the reaction) and after 24 hours from the start of the reaction (ending stage of the reaction) was small, the change in the yield of other fractions was small, the average BTX yield after reacting for 24 hours was high, and hence, aromatic hydrocarbons of 6 to 8 carbon atoms could be produced with favorable yield, as compared to Comparative Example 9 in which reaction was conducted with a catalyst which had not been subjected to hydrothermal treatment.

Therefore, it was confirmed that, in Example 16 of the present invention, it was possible to stabilize the operation of the plant, and efficiently produce BTX by using a catalyst which had been subjected to an appropriate hydrothermal treatment in advance.

INDUSTRIAL APPLICABILITY

The present invention relates to a method for producing a monocyclic aromatic hydrocarbon. According to the present invention, it is possible to reduce the change in time of the yield of BTX fraction in the cracking and reforming reaction step, thereby stabilizing the operation of the plant. In addition, it becomes possible to improve the yield of the BTX fraction in the cracking and reforming reaction step.

REFERENCE SIGNS LIST

1 CRACKING FURNACE
31 HYDROGENATION REACTION DEVICE
33 CRACKING AND REFORMING REACTION DEVICE (FIXED-BED REACTOR)

The invention claimed is:

1. A method for producing a monocyclic aromatic hydrocarbon, comprising:
    a cracking and reforming reaction step comprising loading a catalyst containing crystalline aluminosilicate which has been subjected to a heat treatment in advance into a fixed-bed reactor, wherein the heat treatment is conducted at a temperature from 700° C. to 850° C., under an atmosphere comprising water vapor content of from 10 vol % to 100 vol %, and for a time from 15 minutes to 5 hours, and
    bringing a feedstock oil having a 10 volume % distillate temperature of 140° C. or higher and a 90 volume % distillate temperature of 390° C. or lower into contact with the catalyst to conduct a reaction, thereby obtaining a product containing a monocyclic aromatic hydrocarbon having 6 to 8 carbon atoms, wherein a yield of the monocyclic aromatic hydrocarbon having 6 to 8 carbon atoms contained in the product 24 hours after the start of the reaction is 29% by mass or more.

2. The method according to claim 1, wherein the crystalline aluminosilicate includes a medium-pore zeolite and/or a large-pore zeolite as a main component.

3. The method according to claim 1, wherein the catalyst contains at least one member selected from the group consisting of phosphorus, an alkaline-earth metal and a rare-earth element.

4. The method according to claim 1, wherein the catalyst contains at least one member selected from the group consisting of silica and alumina as a binder.

5. The method according to claim 1, wherein, in the cracking and reforming reaction step, two or more fixed-bed reactors are used and a cracking and reforming reaction and a regeneration of spent catalyst are repeated while the fixed-bed reactors are periodically switched.

6. The method according to claim 1, wherein the feedstock oil is a thermally-cracked heavy oil obtained from an ethylene production apparatus or a partially-hydrogenated product of the thermally-cracked heavy oil.

7. The method according to claim 1, wherein the feedstock oil is a cracked light oil or a partially-hydrogenated product of the cracked light oil.

* * * * *